United States Patent
Okada et al.

(10) Patent No.: US 11,540,602 B2
(45) Date of Patent: Jan. 3, 2023

(54) HYBRID FRAME SLEEVE CASE

(71) Applicant: Incase Designs Corp., Irvine, CA (US)

(72) Inventors: Kenji Okada, Long Beach, CA (US); Hyun Hong, Los Angeles, CA (US); Dominique Velasco Fonacier, Alhambra, CA (US); Kevin I-Feng Fang, Chino, CA (US)

(73) Assignee: Vinci Brands LLC, Tustin, CA (US)

( * ) Notice: Subject to any disclaimer, the term of this patent is extended or adjusted under 35 U.S.C. 154(b) by 112 days.

(21) Appl. No.: 17/088,563

(22) Filed: Nov. 3, 2020

(65) Prior Publication Data
US 2021/0045510 A1 Feb. 18, 2021

Related U.S. Application Data

(63) Continuation-in-part of application No. 16/245,199, filed on Jan. 10, 2019, now Pat. No. 10,824,202, and a continuation-in-part of application No. 16/242,400, filed on Jan. 8, 2019, now abandoned, and a continuation-in-part of application No. 15/497,000, filed on Apr. 25, 2017, now Pat. No. 10,820,674, which is a continuation of application No. 14/673,495, filed on Mar. 30, 2015, now Pat. No. 9,642,428.

(60) Provisional application No. 62/615,938, filed on Jan. 10, 2018, provisional application No. 61/972,137, filed on Mar. 28, 2014.

(51) Int. Cl.
*A45C 11/00* (2006.01)
*B65D 81/22* (2006.01)
*G06F 1/16* (2006.01)
*A45C 13/00* (2006.01)

(52) U.S. Cl.
CPC .............. *A45C 11/00* (2013.01); *B65D 81/22* (2013.01); *G06F 1/1656* (2013.01); *A45C 13/002* (2013.01); *A45C 2011/003* (2013.01); *Y10T 29/49826* (2015.01)

(58) Field of Classification Search
CPC .. B65D 81/053; B65D 81/0578; B65D 81/05; B65D 81/022; B65D 81/025; B65D 33/02; B65D 2581/055; A45C 3/02; A45C 3/001; A45C 3/06; A45C 2013/025; A45C 2013/003; A45C 2005/035; A45C 2005/032; A45C 13/36; A45C 13/002
USPC ..... 206/38–241; 190/37, 127, 126; 150/147, 150/149
See application file for complete search history.

*Primary Examiner* — Mollie Impink
(74) *Attorney, Agent, or Firm* — Scale LLP

(57) ABSTRACT

A hybrid frame sleeve case for a portable electronic device is disclosed herein. The portable electronic device may be a laptop computer, a tablet, or another portable electronic device. The case may include flexible panels, such as neoprene or fabric panels, attached to an elastic polymer frame, such as ethylene vinyl acetate (EVA). The elastic polymer frame extends around a perimeter of the sleeve to provide cushioning or padding for the side edges of the sleeve. A magnetic latch or other latch may be used to secure an opening on one side of the sleeve. The case may optionally include a charging system that allows the portable electronic device to be charged while housed in the case or otherwise positioned to allow charging by the charging system.

14 Claims, 39 Drawing Sheets

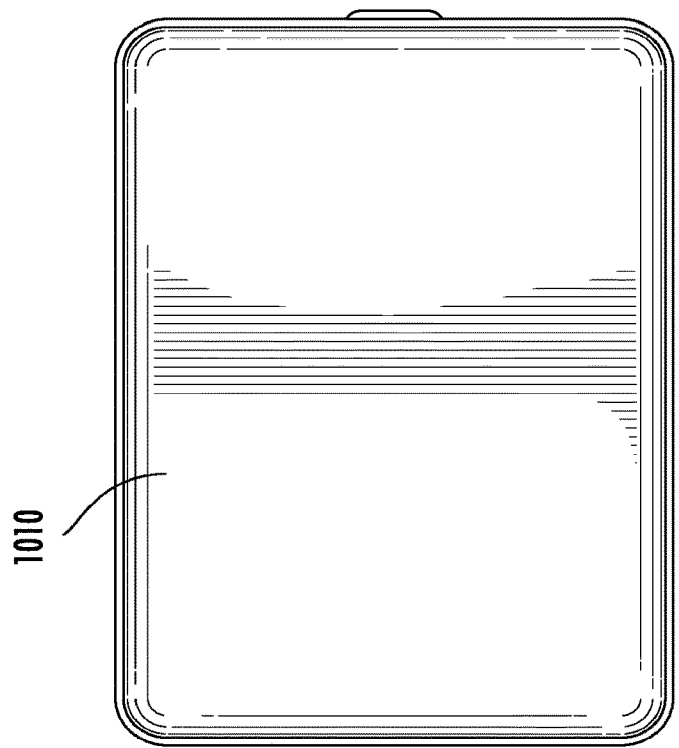
FIG. 10C
FIG. 10B
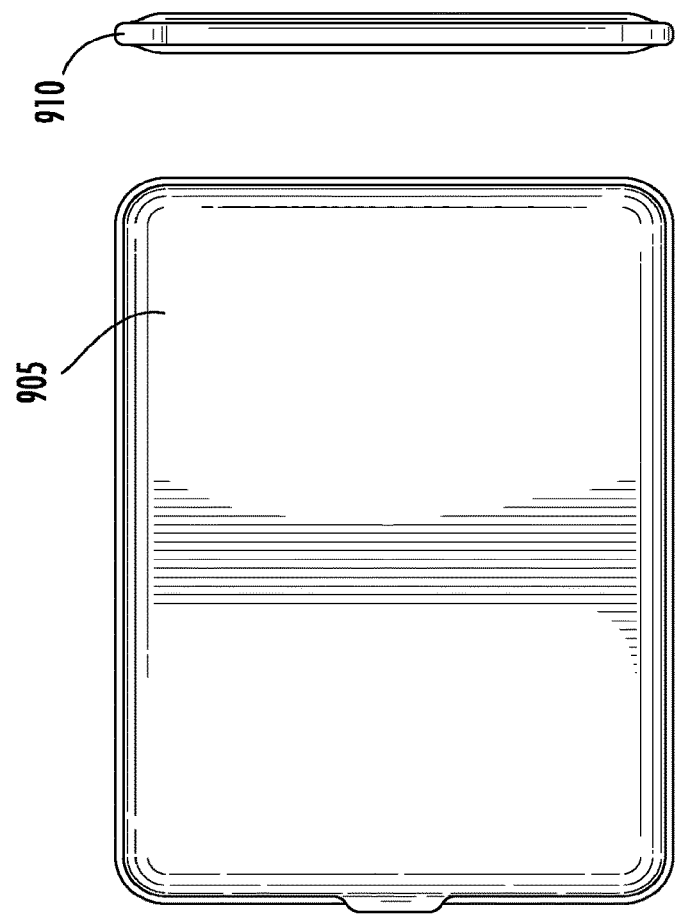
FIG. 10A

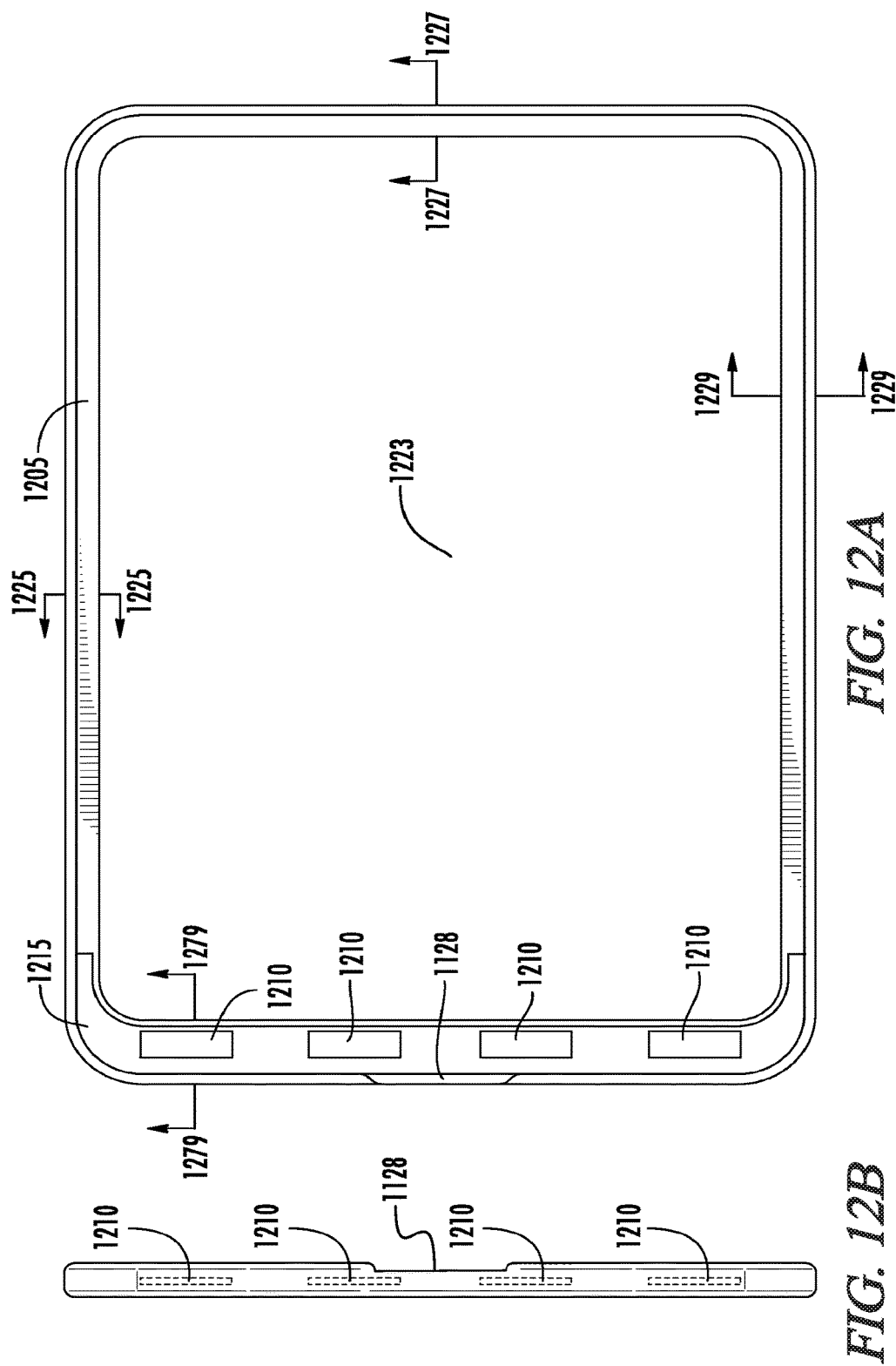
FIG. 12A
FIG. 12B
FIG. 12C

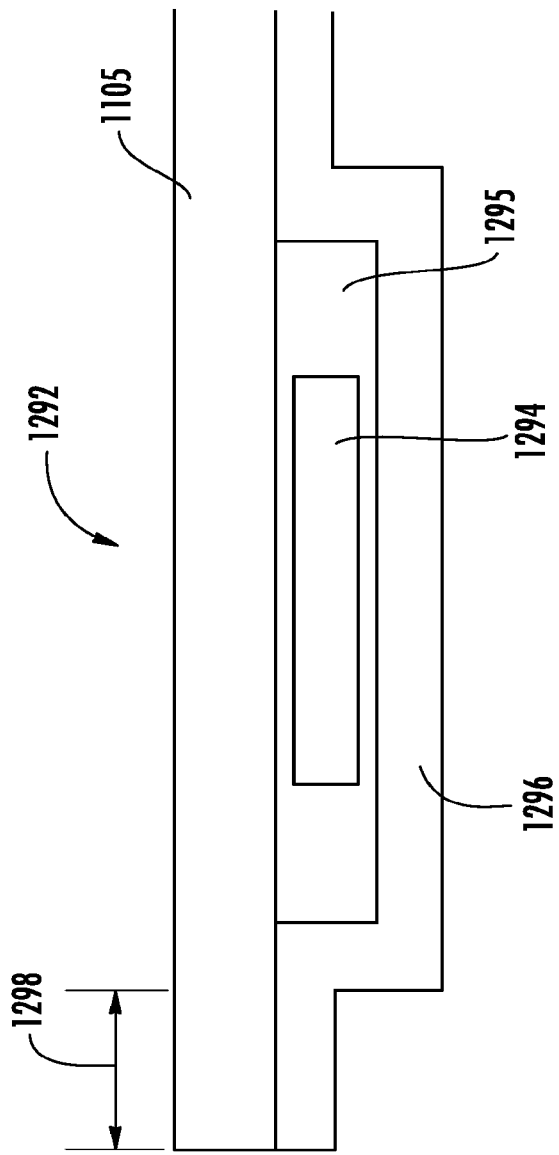

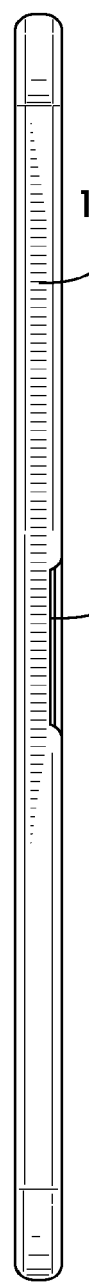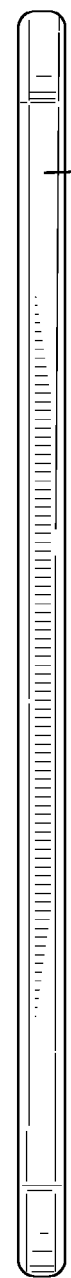
*FIG. 16B*  *FIG. 16E*
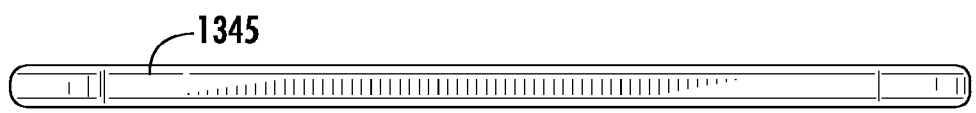
*FIG. 16C*
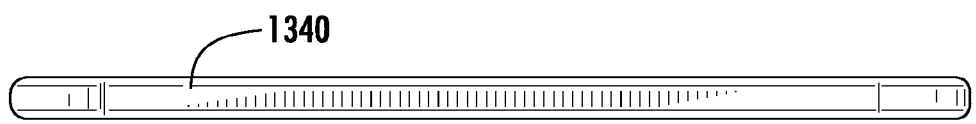
*FIG. 16D*

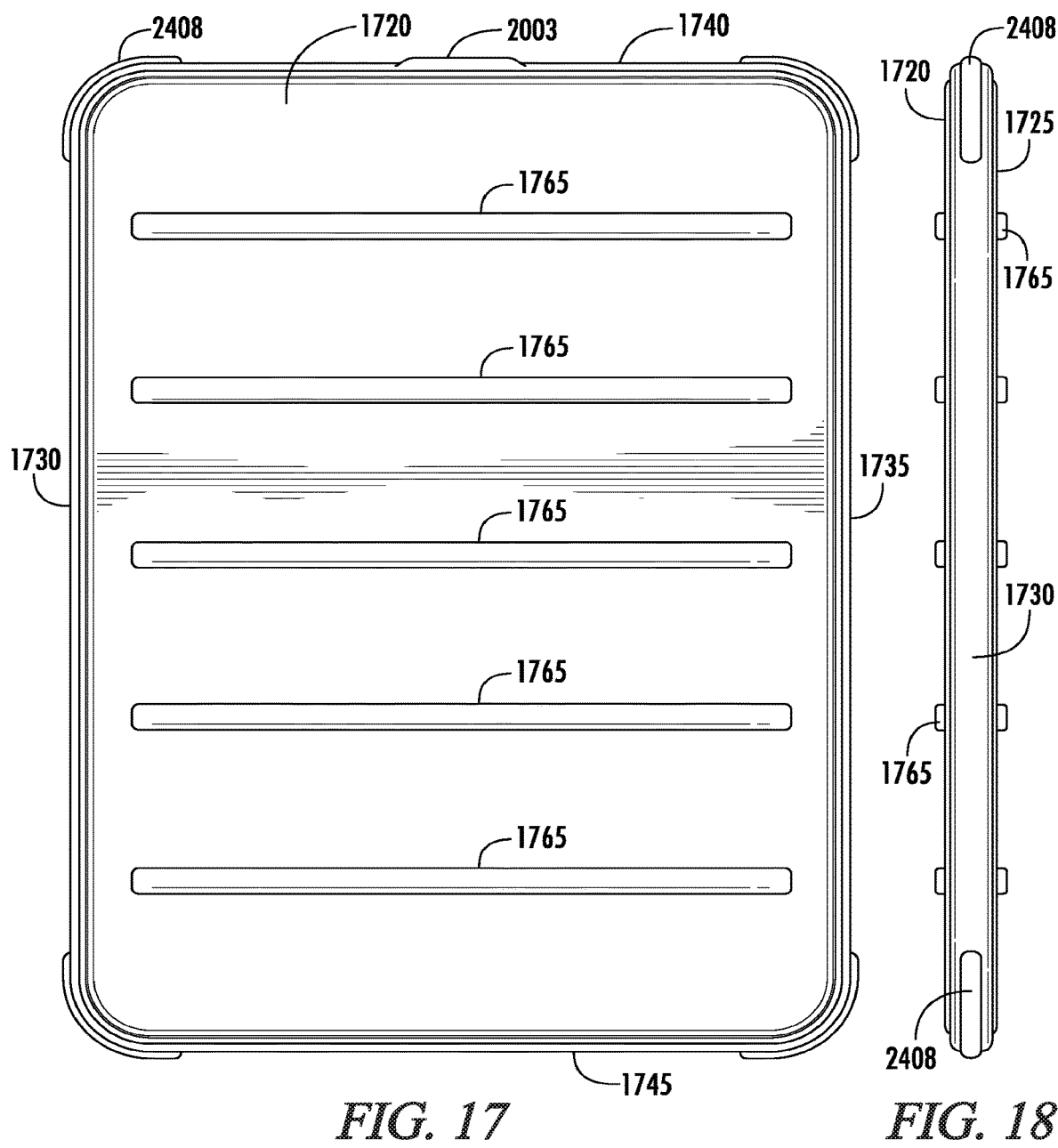

HYBRID FRAME SLEEVE CASE

CROSS-REFERENCE TO RELATED APPLICATIONS

This application is a continuation-in-part of U.S. patent application Ser. No. 15/497,000, filed on Apr. 25, 2017, which is a continuation of U.S. patent application Ser. No. 14/673,495, filed on Mar. 30, 2015 and issued as U.S. Pat. No. 9,642,428 on May 9, 2017, which claims the benefit of and priority to U.S. Provisional Patent Application Ser. No. 61/977,137, filed on Mar. 28, 2014; this application is also a continuation-in-part of U.S. patent application Ser. No. 16/245,199, filed on Jan. 10, 2019, which claims the benefit of and priority to U.S. Provisional Patent Application Ser. No. 62/615,938, filed on Jan. 10, 2018; and this application is also a continuation-in-part of U.S. patent application Ser. No. 16/242,400, filed on Jan. 8, 2019, which claims the benefit of and priority to U.S. Provisional Patent Application Ser. No. 62/615,938, filed on Jan. 10, 2018; the entireties of which are hereby incorporated herein by reference.

BACKGROUND

Field of the Invention

The present disclosure relates to cases for portable electronic devices.

Description of the Related Art

Portable electronic devices, such as smartphones, tablets, laptops, and the like are known to sustain damage from impact and from contamination as a result of the ingress of water or other fluids. Such damage may result, for example, in a cracked screen, scratches on a finished surface, lost or damaged buttons or controls, cracked or bent external body components, and/or failed or malfunctioning electrical components. Some types of damage may be merely cosmetic (e.g., scratches). However, other types of damage may ruin or limit the functionality of the device. Such devices often contain sensitive and fragile components (e.g., a screen, a camera lens, processors, storage drives, accelerometers, and sensors). Accidentally dropping the device could render various features unusable.

Protective cases can protect portable electronic devices from such damage and other types of damage. Thus there remains a continuing need for new and improved protective cases for portable electronic devices.

SUMMARY

A hybrid frame sleeve case for a portable electronic device is disclosed herein. The portable electronic device may be a laptop computer, a tablet, or another portable electronic device. The case may include flexible panels, such as neoprene or fabric panels, attached to an elastic polymer frame, such as ethylene vinyl acetate (EVA). The elastic polymer frame extends around a perimeter of the sleeve to provide cushioning or padding for the side edges of the sleeve. A magnetic latch or other latch may be used to secure an opening on one side of the sleeve.

A sleeve case may preferably have a rectangular shape, with two longer sides and two shorter sides, and rounded corners. The sleeve may have an opening on one of the shorter sides of the sleeve or alternatively may have an opening on one of the longer sides of the sleeve. This opening may be secured by a magnetic latch. The sleeve may include front and back neoprene panels. These may be attached to an elastic polymer or rubber frame (e.g., EVA frame) by stitching, glue, epoxy, welding, fusing, or another suitable technique. The frame preferably extends along all sides of the sleeve, thereby providing cushioning and protection for the sides of the case.

In some embodiments, the elastic polymer frame may be formed by injection molding.

In some embodiments, the disclosed case includes: a frame structure including a frame border having an exterior edge and interior edge, where the exterior and interior edges separated by a frame border width, where the frame structure comprises a first material, and where the interior edge surrounds a perimeter of a compartment for the portable electronic device; a first side panel, attached to a first side of the frame border, where the first side panel includes a second material that is different from the first material, where the first material is more shock absorbing than the second material; and a second side panel, attached to a second side of the frame border, where the second panel includes the second material.

In some embodiments, the sides of the portable electronic, device may be cushioned against side impacts by the first material having a thickness of the frame border width. A thicker frame border will provide greater shock absorbing capability but will also increase the overall size of the case. The first material may be foam rubber. Alternatively, the first material may be ethylene vinyl acetate and the second material may be neoprene.

In some embodiments, the case includes an ethylene vinyl acetate (EVA) frame that includes: a first side, a second side, a third side, and a fourth side, where the first side is adjacent to the second and fourth sides, and opposite to the third side, the second side is adjacent to the first and third sides, and opposite to the fourth side, and the second side is longer than the first side. A cross section of the second side includes a first portion extending in a first direction and a second portion extending in a second direction that is transverse to the first direction. The first portion includes an exterior side and an interior side, and the first portion has a first length from a first end to a second end in the first direction. The second portion is attached to the interior side of the first portion at a point between the first and second ends and extends in the second direction away from the first portion a second length.

The case includes a compartment, enclosure, or space formed by the first, second, third, and fourth sides, where first and third sides of the compartment are bounded by the first and third sides that extend in the second direction. Second and fourth sides of the compartment are bounded by the second and fourth sides that extend, a third direction that is transverse to the second direction.

In some embodiments, the case includes a first neoprene panel that is attached (e.g., via stitching or an adhesive) to a first side of the EVA frame. In such embodiments, the case also includes a second neoprene panel that is attached to a second side of the EVA frame. The second side of the EVA frame is opposite to the first side, and the compartment (which will hold the device to be protected by the case) is bounded on opposite sides by the first and second neoprene panels.

In various embodiments, the second length is greater than the first length. A cross section of the first side includes a third portion extending in the first direction and a fourth portion extending in a third direction that is transverse to the first direction. The third portion includes an exterior side and an interior side. The fourth portion is attached to the interior side of the third portion at a point between the third and fourth ends, and extends in the third direction away from the third portion a third length. The third length may be greater than the second length.

The fourth portion may include a recessed region that may be shaped to hold a magnet. The third portion has a fourth length from a third end to a fourth end in the first direction, and the fourth length may be greater than the first length or, alternatively, the fourth length may be the same as the first length.

The compartment is an enclosed space that retains (and protects) a portable electronic device. The case may include a latch that includes a first latch component and a second latch component, where the first latch component may be attached to the second neoprene panel and the second latch component may be attached to the first side of the EVA frame, and where the second latch component is adapted to mate with the first latch component. The second latch component may alternatively be attached to the second side of the EVA frame. An opening to the compartment is open when the first and second latch components are separated. The opening to the compartment is closed when the first and second latch components are latched together.

In some embodiments, the latch may be a magnetic latch. A first magnetic latch component is attached to the second neoprene panel. A second magnetic latch component is attached to the EVA frame. An opening to the compartment is open when the first and second magnetic latch components are separated from each other. The opening to the compartment is closed when the first and second magnetic latches are latched together via magnetic attraction.

In some embodiments, the first neoprene panel is stitched to the first side of the EVA frame, and the second neoprene panel is stitched to the second side of the EVA frame.

A method of protecting a portable electronic device is also disclosed herein. The method includes: providing a frame structure for a portable electronic device having a frame border with an exterior edge and interior edge, where the frame structure is made of a first material; separating the exterior and interior edges by a frame border width; using the interior edge of the frame structure to surround a perimeter of a compartment for the portable electronic device; attaching a first side panel to a first side of the frame border, where the first side panel is made of a second material, different from the first material; and attaching a second side panel to a second side of the frame border, where the second panel is made of the second material, and the first material is more shock absorbing than the second material. The sides of the portable electronic device are cushioned against side impacts by the first material having a thickness that is approximately equal to the frame border width.

The disclosed case may be referred to as a sleeve, portfolio, a portable electronic device enclosure, wallet, container, folder, folding case, pocketbook, folding pocketbook, box, jacket, or envelope. The case may include one or more pockets. The pockets may be used to hold pens, pencils, papers, business cards, credit cards, money, accessories for the portable electronic device (e.g., charger, stylus), and so forth. A sleeve, frame, or both as described herein may be referred to as a portable electronic device holder, enclosure, container, or receptacle.

In some embodiments, the disclosed case further includes a charging system that includes a battery compartment that houses a rechargeable battery. The front face side panel has a cushioned flexible construction, while the opposing back face side panel has a semi-rigid outer panel construction that defines a battery compartment that houses a rechargeable battery. The rechargeable battery is electrically coupled to a plurality of interfaces that facilitate control and power to and from the battery. The interfaces include one or more internal electrical connectors mounted in the device compartment. The internal connectors are selected and positioned to electrically communicate with the portable electronic device and thereby facilitate charging of the device when the device is inserted in and protected by the case. The inclusion of multiple internal connectors allows for multiple connection points that are capable of connecting to the device when the device is inserted into the case, which for example would be capable of facilitating charging of the device regardless of whether the device is inserted into the case face-up or face-down. The electrical interfaces also include one or more external electrical connectors that are accessibly positioned on the outside of the case and that facilitate charging of one or more electronic devices that are located outside or external to the case as well as charging of the battery from a power source. A connector cable is provided to facilitate charging. A battery charge gauge and an activation button are also provided on the outside of the case to allow monitoring of the charge status of the rechargeable battery and to allow control over power to and from the case. A magnetic latch or other latch is used to secure an opening on one side of the case.

BRIEF DESCRIPTION OF THE DRAWINGS

FIGS. 10A-10C show the front, side, and back of an embodiment of the hybrid sleeve.

FIGS. 12A-12C show front, side, and bottom views of an embodiment of the elastic polymer frame.

FIG. 12F shows a cross section of a portion of an embodiment of a panel.

FIGS. 16A-16F show a frame for an embodiment of the hybrid sleeve case.

FIGS. 17-24 show an embodiment of the hybrid sleeve case.

DETAILED DESCRIPTION OF THE ILLUSTRATED EMBODIMENTS

Figure 1:
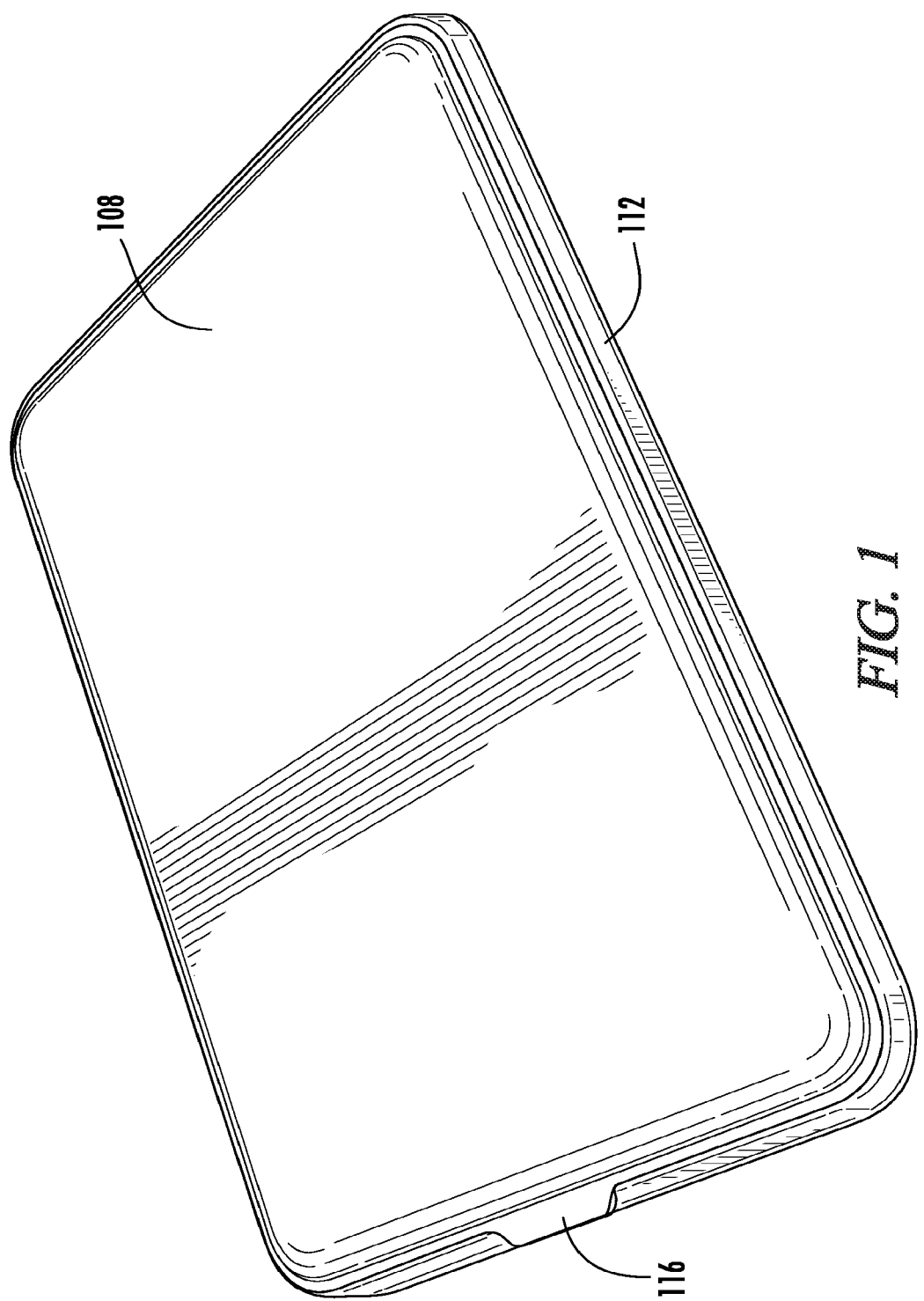
FIGS. 1-2 show an embodiment of the hybrid frame sleeve case.

A hybrid frame sleeve case tor a portable electronic device is disclosed herein. The portable electronic device may be a laptop computer, a tablet, or another portable electronic device. The case may include flexible panels, such as neoprene or fabric panels, attached to an elastic polymer frame, such as ethylene vinyl acetate (EVA). The elastic polymer frame extends around a perimeter of the sleeve to provide cushioning or padding for the side edges of the sleeve. A magnetic latch or other latch may be used to secure an opening on one side of the sleeve.

A sleeve case may preferably have a rectangular shape, with two longer sides and two shorter sides, and rounded corners. The sleeve may have an opening on one of the shorter sides of the sleeve or alternatively may have an opening on one of the longer sides of the sleeve. This opening may be secured by a magnetic latch. The sleeve may include front and back neoprene panels. These may be attached to an elastic polymer or rubber frame (e.g., EVA frame) by stitching, glue, epoxy, welding, fusing, or another suitable technique. The frame preferably extends along all sides of the sleeve, thereby providing cushioning and protection for the sides of the case.

In some embodiments, the elastic polymer frame may be formed by injection molding.

In some embodiments, the disclosed case includes: a frame structure including a frame border having an exterior edge and interior edge, where the exterior and interior edges separated by a frame border width, where the frame structure comprises a first material, and where the interior edge surrounds a perimeter of a compartment tier the portable electronic device; a first side panel, attached to a first side of the frame border, where the first side panel includes a second material that is different from the first material, where the first material is more shock absorbing than the second material; and a second side panel, attached to a second side of the frame border, where the second panel includes the second material.

In some embodiments, the sides of the portable electronic device may be cushioned against side impacts by the first material having a thickness of the frame border width. A thicker frame border will provide greater shock absorbing capability but will also increase the overall size of the case. The first material, may be foam rubber. Alternatively, the first material may be ethylene vinyl acetate and the second material may be neoprene.

In some embodiments, the case includes an ethylene vinyl acetate (EVA) frame that includes: a first side, a second side, a third side, and a fourth side, where the first side is adjacent to the second and fourth sides, and opposite to the third side, the second side is adjacent to the first and third sides, and opposite to the fourth side, and the second side is longer than the first side. A cross section of the second side includes a first portion extending in a first direction and a second portion extending in a second direction that is transverse to the first direction. The first portion includes an exterior side and an interior side, and the first portion has a first length from a first end to a second end in the first direction. The second portion is attached to the interior side of the first portion at a point between the first and second ends and extends in the second direction away from the first portion a second length.

The case includes a compartment, enclosure, or space formed by the first, second, third, and fourth sides, where first and third sides of the compartment are bounded by the first and third sides that extend in the second direction. Second and fourth sides of the compartment are bounded by the second and fourth sides that extend a third direction that is transverse to the second direction.

In some embodiments, the case includes a first neoprene panel that is attached (e.g., via stitching or an adhesive) to a first side of the EVA frame. In such embodiments, the case also includes a second neoprene panel that is attached to a second side of the EVA frame. The second side of the EVA frame is opposite to the first side, and the compartment (which will hold the device to be protected by the case is bounded on opposite sides by the first and second neoprene panels.

In various embodiments, the second length is greater than the first length. A cross section of the first side includes a third portion extending in the first direction and a fourth portion extending in a third direction that is transverse to the first direction. The third portion includes an exterior side and an interior side. The fourth portion is attached to the interior side of the third portion at a point between the third and fourth ends, and extends in the third direction away from the third portion a third length. The third length may be greater than the second length.

The fourth portion may include a recessed region, that may be shaped to hold a magnet. The third portion has a fourth length from a third end to a fourth end in the first direction, and the fourth length may be greater than the first length or, alternatively, the fourth length may be the same as the first length.

The compartment is an enclosed space that retains (and protects) a portable electronic device. The case may include a latch that includes a first latch component and a second latch component, where the first latch component may be attached to the second neoprene panel and the second latch component may be attached to the first side of the EVA frame, and where the second latch component is adapted to mate with the first latch component. The second latch component may alternatively be attached to the second side of the EVA frame. An opening to the compartment is open when the first and second latch components are separated. The opening to the compartment is closed when the first and second latch components are latched together.

In some embodiments, the latch may be a magnetic latch. A first magnetic latch component is attached to the second neoprene panel. A second magnetic latch component is attached to the EVA frame. An opening to the compartment is open when the first and second magnetic latch components are separated from each other. The opening to the compartment is closed when the first and second magnetic latches are latched together via magnetic attraction.

In some embodiments, the first neoprene panel is stitched to the first side of the EVA frame, and the second neoprene panel is stitched to the second side of the EVA frame.

A method of protecting a portable electronic device, is also disclosed herein. The method includes; providing a frame structure for a portable electronic device having a frame border with an exterior edge and interior edge, where the frame structure is made of a first material; separating the exterior and interior edges by a frame border width; using the interior edge of the frame structure to surround a perimeter of a compartment for the portable electronic device; attaching a first side panel to a first side of the frame border, where the first side panel is made of a second material, different from the first material; and attaching a second side panel to a second side of the frame border, where the second panel is made of the second material, and the fast material is more shock absorbing than the second material. The sides of the portable electronic device are cushioned against side impacts by the first material having a thickness that is approximately equal to the frame border width.

The disclosed case may be referred to as a sleeve, portfolio, a portable electronic device enclosure, wallet, container, folder, folding case, pocketbook, folding pocketbook, box, jacket, or envelope. The case may include one or more pockets. The pockets may be used to hold pens, pencils, papers, business cards, credit cards, money, accessories for the portable electronic device (e.g., charger, stylus), and so forth. A sleeve, frame, or both as described herein may be referred to as a portable electronic device holder, enclosure, container, or receptacle.

In some embodiments, the disclosed case further includes a charging system that includes a battery compartment that houses a rechargeable battery. The front face side panel has a cushioned flexible construction, while the opposing back face side panel has a semi-rigid outer panel construction that defines a battery compartment that houses a rechargeable battery. The rechargeable battery is electrically coupled to a plurality of interfaces that facilitate control and power to and from the battery. The interfaces include one or more internal electrical connectors mounted in the device compartment. The internal connectors are selected and positioned to electrically communicate with the portable electronic device and thereby facilitate charging of the device when the device is inserted in and protected by the case. The inclusion of multiple internal connectors allows for multiple connection points that are capable of connecting to the device when the device is inserted into the case, which for example would be capable of facilitating charging of the device regardless of whether the device is inserted into the case face-up or face-down. The electrical interfaces also include one or more external electrical connectors that are accessibly positioned on the outside of the case and that facilitate charging of one or more electronic devices that are located outside or external to the case as well as charging of the battery from a power source. A connector cable is provided to facilitate charging. A battery charge gauge and an activation button are also provided on the outside of the case to allow monitoring of the charge status of the rechargeable battery and to allow control over power to and from the case. A magnetic latch or other latch is used to secure an opening on one side of the case.

Figure 2:
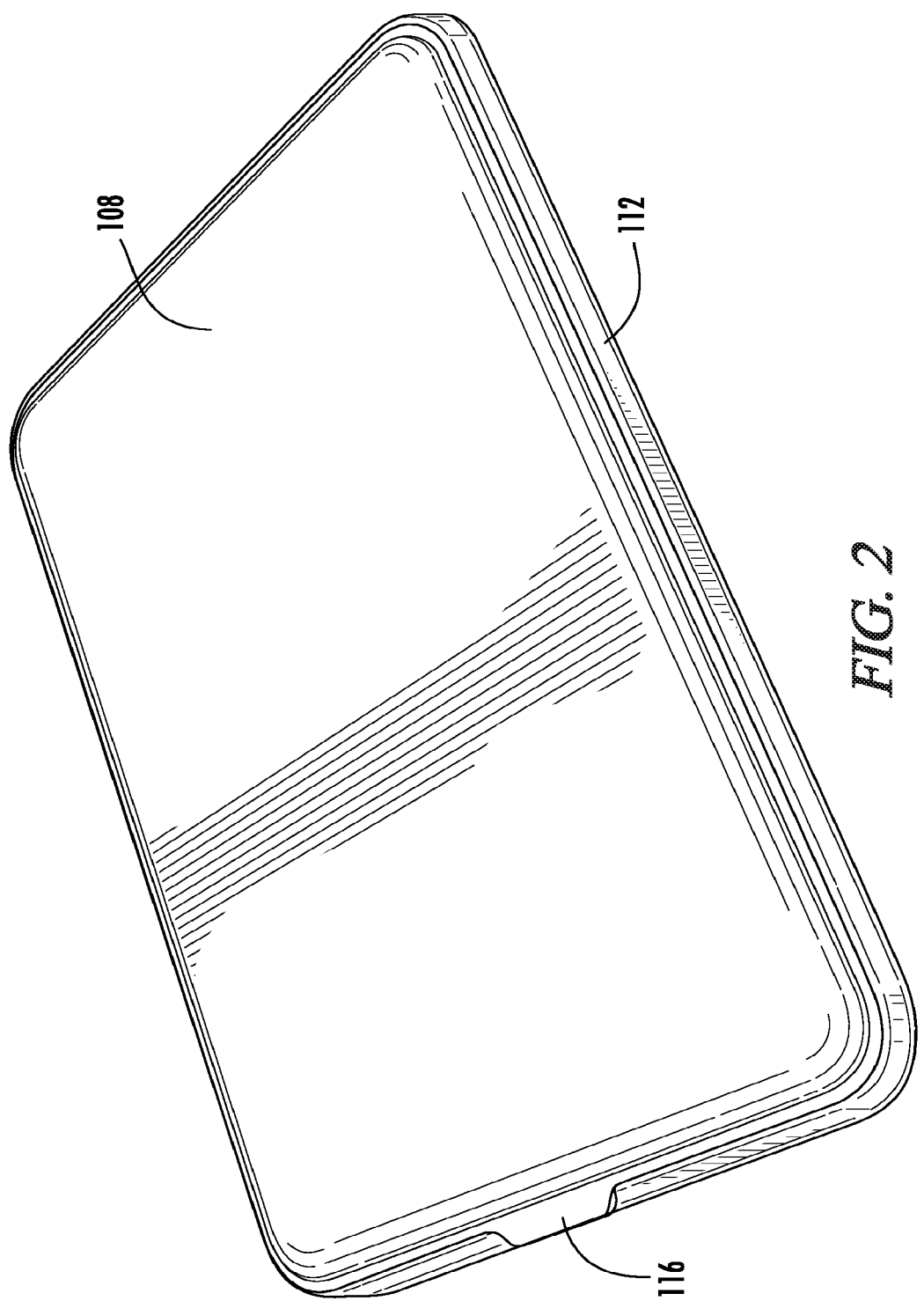

FIGS. 1-2 show an embodiment of the disclosed hybrid frame sleeve case. The case is a neoprene sleeve for a portable electronic device such as a laptop or tablet. The sleeve includes a neoprene front panel 108 and back panel (not shown), and an ethylene vinyl acetate (EVA) frame 112 along an edge of the sleeve. The EVA frame extends around the perimeter of the sleeve and provides additional protection for the contents of the case. The device slips in from one side of the sleeve, opened by using a tab 116 and closed using a magnetic latch (not shown).

The color of the frame may be a neon- or fluorescent-type color, such as a yellow or yellow-green color (alternatively referred to as lumen color). Neon colors for the frame will outline the case in a bright color, which allows the case to be more easily visible in low light or dark conditions. The frame may also be embedded with reflective material or glow-in-the-dark material. This also allows the case to be more easily visible in low light or dark conditions. In a darkened conference room or meeting hall, this may assist a user in locating the case and also help prevent others from stepping on the case.

Figure 3:
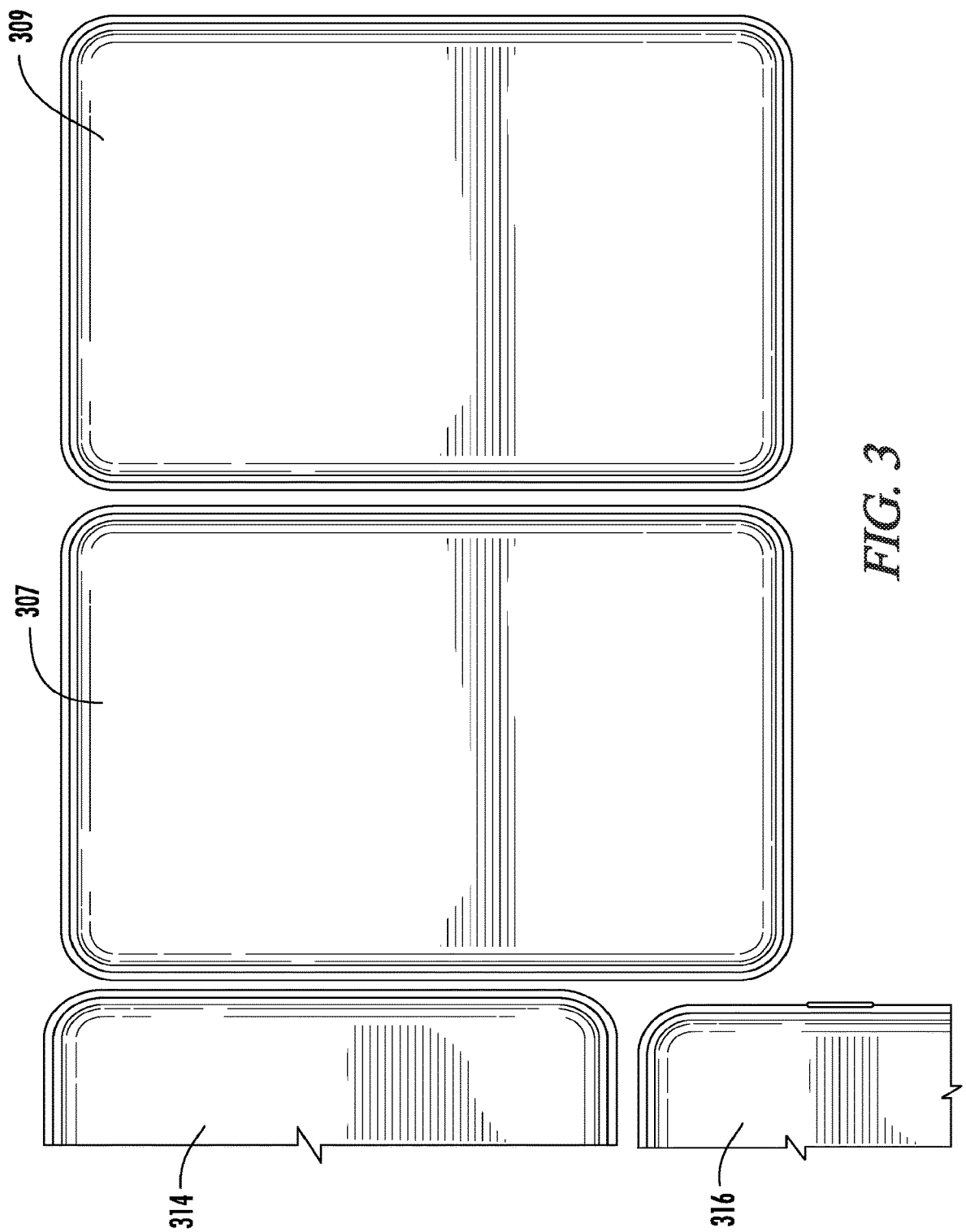
FIG. 3 shows a top view of various-sized embodiments of the hybrid frame sleeve case.

FIG. 3 shows a top view of various sizes of embodiments of the disclosed hybrid frame sleeve case. In various implementations, the sleeve is sized appropriately for laptops and tablets. For example, the hybrid sleeve may have dimensions appropriate for an Apple MacBook® product (e.g., MacBook Pro® or MacBook Air®) or a similar laptop computer. Sleeves 307 and 309 are shown for a MacBook® product with a 13-inch screen size. The hybrid sleeve may alternatively have dimensions appropriate for an Apple iPad® product (e.g., Apple iPad®, iPad Air®, iPad mini®) or a similar tablet computer. Sleeves 314 and 316 are shown for an iPad Air® product.

The actual dimensions of the device may vary to accommodate different purposes, including the different sizes and dimensions of electronic devices being housed.

In other embodiments, the disclosed case, is dimensioned to house a tablet computer, tablet PC, or other tablet-type electronic device.

A case protects a portable electronic device enclosed therein from scratches, dings, dents, and other damage. The case also provides shock absorption. The case will absorb impacts, preventing shock to the components of the device. The case may also improve a user's grip on the device and case combination as compared to the device alone. The case may include a texture pattern, may be made from a tacky material, may have a tacky coating, and/or may include a shoulder, wrist, or neck strap. The case may also be waterproof or water resistant.

A texture pattern may be incorporated into the panels or frame, or both, of the case. The texture, pattern may be for aesthetics or grip, or a combination thereof. For example, the texture pattern may help hide scratches, scuffs, fingerprints, oil, and other imperfections that may occur to a panel or the frame. For neoprene or other woven or fabric panels, the panel will have a woven texture. For other types of panels or for the frame, the texture can be imprinted or molded into the material.

In some embodiments, a mold for the frame includes an inverse or reverse texture, which results in the frame bumper (e.g., exterior side surface of the bumper) becoming molded with the texture. The frame bumper texture may be a pebbled pattern or another pattern, which will appear in relief (e.g., raised) on the frame bumper surface. The frame may be textured using other patterns, such as a waffle pattern or tire thread, which results in the pattern appearing debossed, indented, sunken, or carved into the frame bumper surface.

Figure 4:
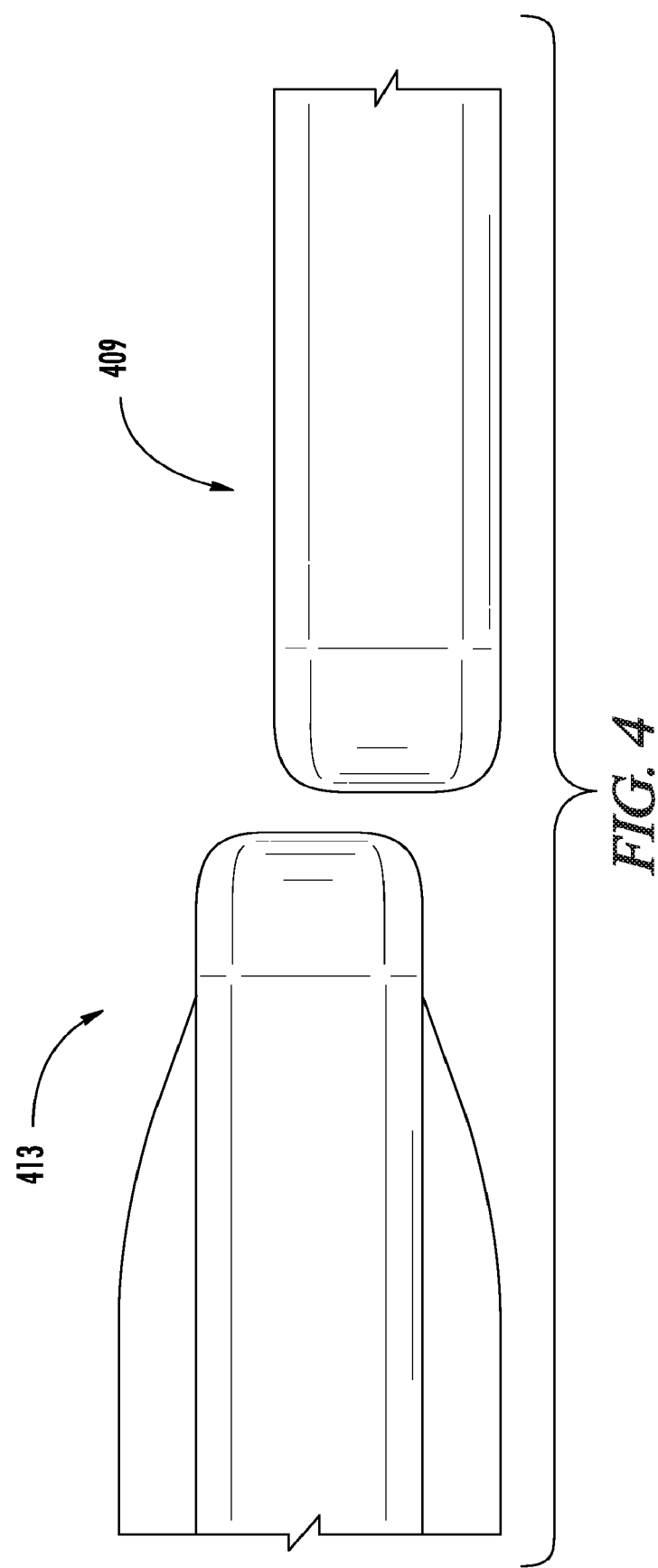
FIG. 4 shows side views for embodiments of the hybrid frame sleeve case.

FIG. 4 shows side views for two embodiments of the disclosed case. An empty sleeve 409 is shown for a 13-inch MacBook®. A sleeve 413 containing the product is shown for the 13-inch MacBook®. Sleeve 413 is thicker than sleeve 409 because the product is in the sleeve.

The dimensions of the sleeve may be less or about the same as the item to be placed into the enclosed or protective space or compartment of the sleeve. The panels of the sleeve and frame can stretch around the item placed inside the sleeve. Typically the panels stretch more than the frame, and the sleeve holds the item (e.g., laptop or tablet) in place in the sleeve by compression. For example, the two panels are positioned on, opposite sides of the device and hold the device so that the frame is positioned against the sides of the device. This ensures the sides of device are protected against side impacts by the frame bumper.

Figure 5:
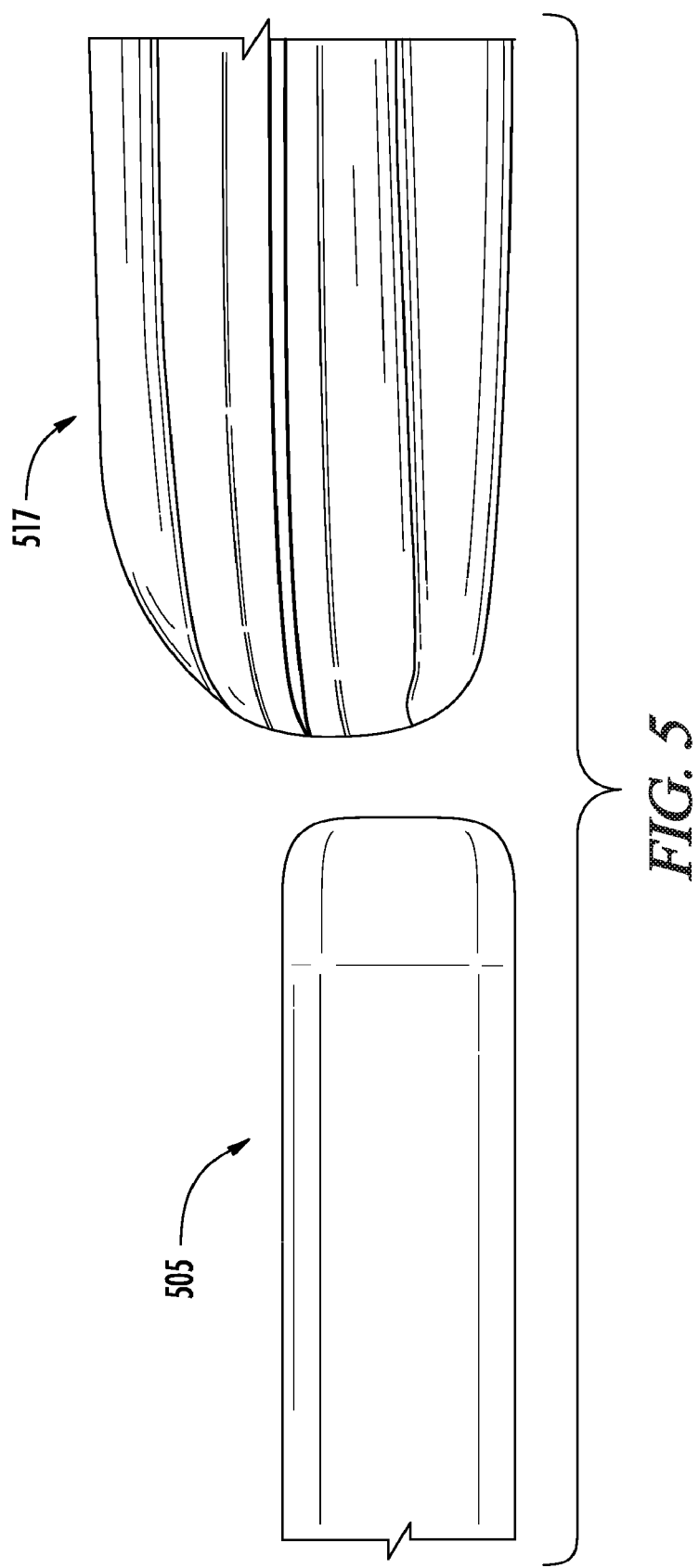
FIG. 5 side views of a hybrid sleeve and a neoprene sleeve which does not have an elastic polymer frame.

FIG. 5 shows side views of a hybrid sleeve 505 and a neoprene sleeve 517 which does not have the EVA frame. Both sleeves are empty. The hybrid sleeve, is thinner than the neoprene sleeve without the EVA frame. In this particular example, the reduction in thickness is more than 50 percent.

The hybrid sleeve also weighs less than the neoprene sleeve without the EVA frame. As an example, a hybrid sleeve with frame for the Apple MacBook® 13-inch weighs about 195 grams (empty) while the neoprene sleeve without the frame for the Apple MacBook® 13-inch weighs about 272 grams (empty). In this particular example, the reduction in weight is more than 25 percent (e.g., about 28 percent).

Figure 6:
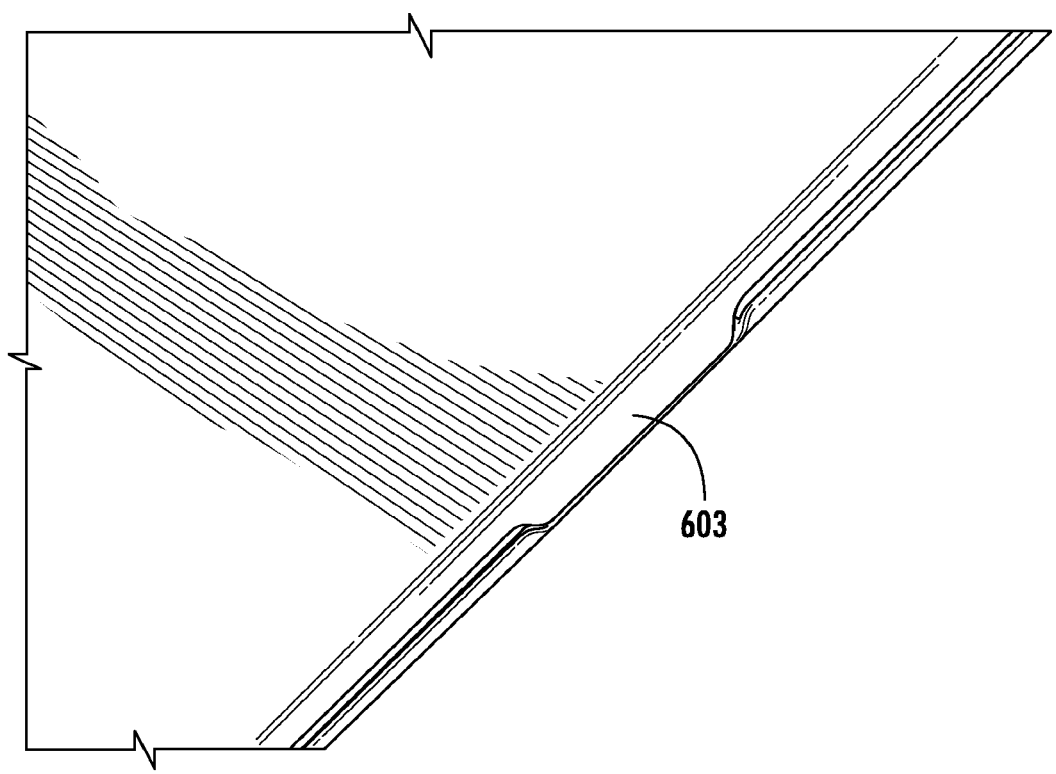
FIG. 6 shows a close-up view of an opening tab of an embodiment of the hybrid, sleeve.

FIG. 6 shows a close-up view of a tab 603 of a hybrid sleeve. This tab is an extension of the neoprene material and is used to open and close the side opening of the sleeve.

Figure 7:
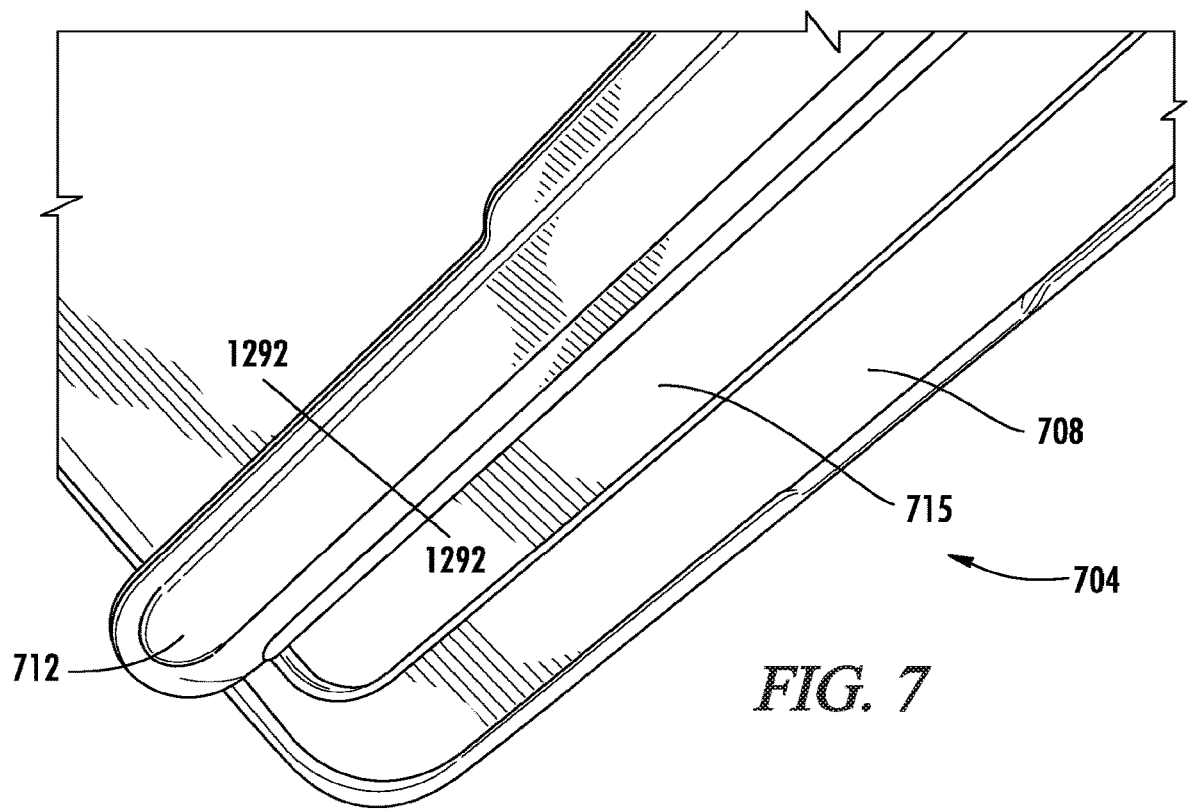
FIG. 7 shows an opening for an embodiment of the hybrid sleeve.

FIG. 7 shows an opening 704 of the hybrid sleeve. The EVA frame is covered with a material 708, which covers magnets. On the neoprene side, there is a bar 712, which is attached to the neoprene material. Underneath bar 712 are a plastic bar and magnets. The magnets under bar 712 align with those under material 708 to hold the sleeve closed. There is a faux fur lining 715 on the inside of the sleeve.

Figure 8:
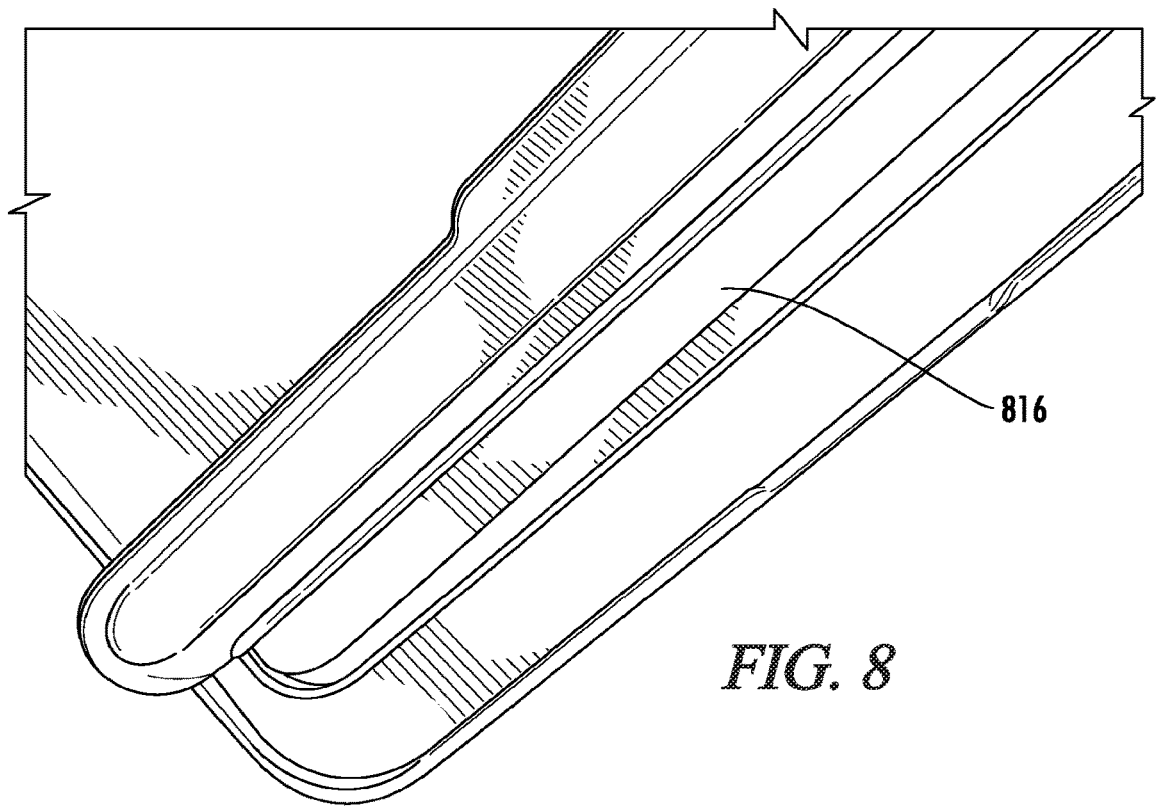
FIG. 8 shows a laptop computer positioned inside an embodiment of the hybrid sleeve.

FIG. 8 shows a laptop computer 816 (e.g., MacBook®) positioned inside the sleeve.

Figure 9:
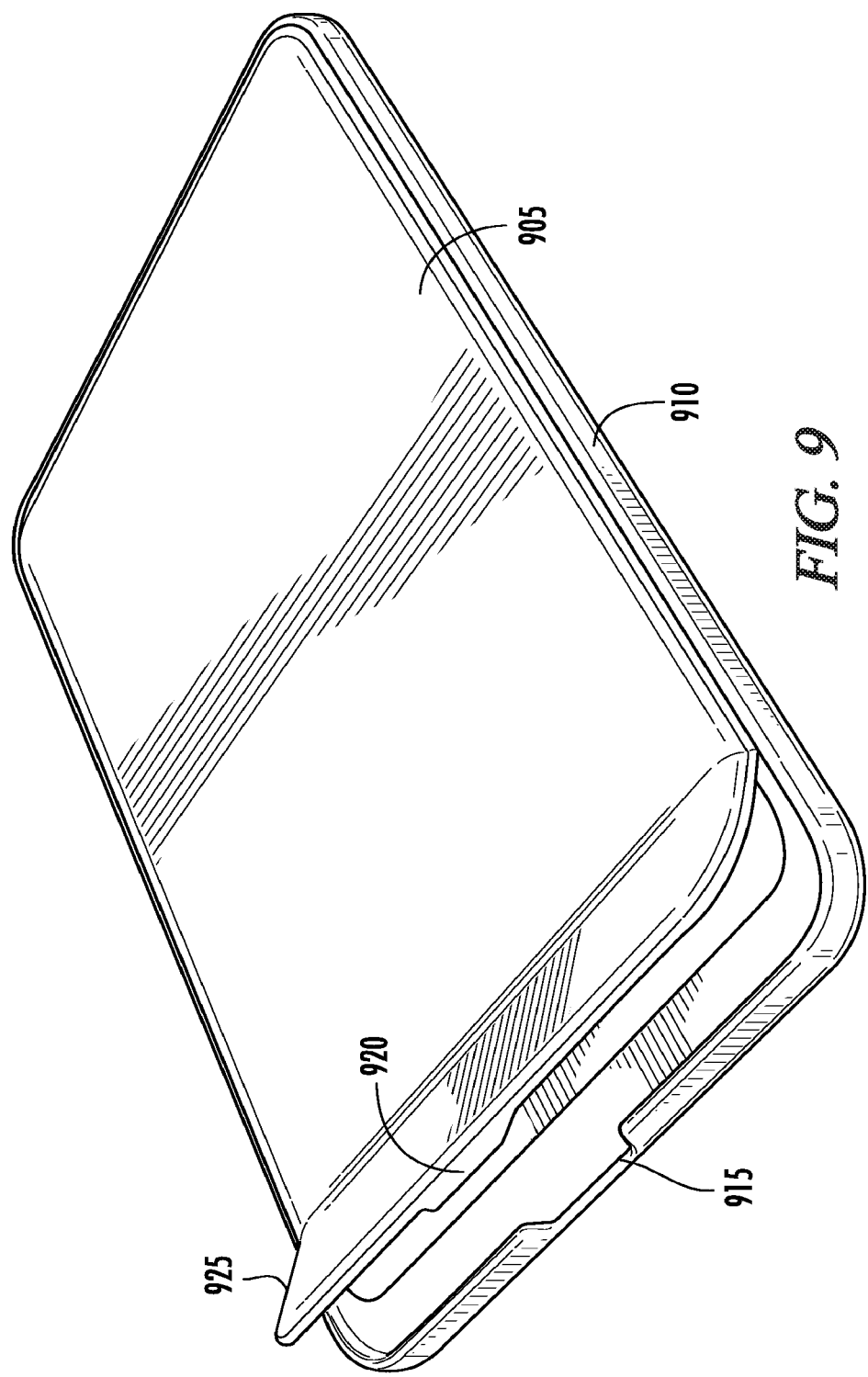
FIG. 9 shows an embodiment of the hybrid frame sleeve case with an overview of the features of the sleeve.

FIG. 9 shows an overview of the features of an embodiment of the disclosed hybrid frame sleeve case. FIGS. 10A-10C show the front, side, and back of the hybrid sleeve. The sleeve has neoprene panels on the front 905 and back 1010. There may optionally be a screen printed logo (not shown) on the front neoprene panel 905. For example, the logo may indicate the branding or manufacturer of the sleeve.

The sleeve has an EVA protective frame 910 that extends around a perimeter of the sleeve. There is a tab cut out 915 in the EVA frame that is positioned opposite a tab 920 of the front neoprene panel. The tab allows easier opening of the front panel, so a user can access the opening in the sleeve by which the device can be inserted or removed.

The opening of the hybrid sleeve is a magnetic opening 925. Magnets are attached to the neoprene sleeve and the frame. These magnets work in conjunction to hold the opening flap closed. For the magnetic latch, both sides (neoprene and EVA sides) may include magnets for the magnetic latch. Alternatively, only a single side (neoprene or EVA side) may have the magnet, while the other side includes a metal plate (e.g., iron sheet) or other magnetic material to attract the magnet. The magnet will be attracted to the metal plate to keep the opening of the hybrid sleeve closed.

In the embodiment of FIGS. 9 and 10A-10C, the front panel (e.g., with the logo) has an opening for inserting a device into the protective compartment, while the back panel (e.g., without a logo) does not have an opening. In other embodiments, the front panel (e.g., with the logo) does not have an opening while the back panel (e.g., without the logo) has an opening. In some embodiments, both the front and back panels have openings; these openings may be on the same side or different sides (e.g., opposite sides) of the case.

Further, the opening in FIGS. 9 and 10A-10C is shown as being on the shorter side of the case. In other embodiments, such as shown in FIGS. 13-16F, the opening is on longer side of the case. In some embodiments, a case may have openings on both the Shorter and longer sides, such as a shorter side opening for the front panel and a longer side opening for the back panel.

In FIG. 9, the inner panels that cover the magnets of the frame (e.g., material 708 in FIG. 7) and inner lining (e.g., lining 715 in FIG. 7) of the sleeve are not shown.

Figure 11:
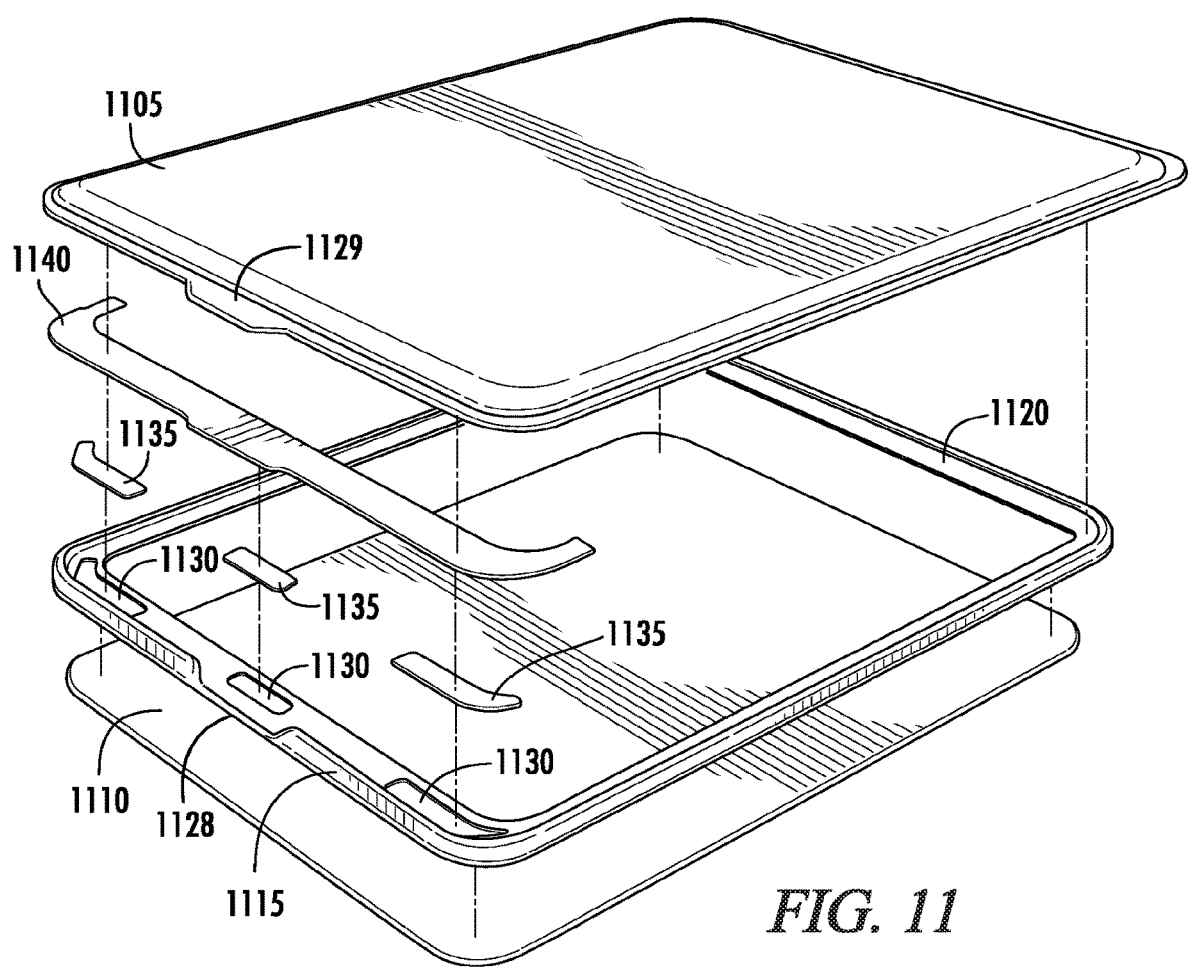
FIG. 11 shows an exploded parts view of an embodiment of the hybrid sleeve.

FIG. 11 shows an exploded view of an embodiment of the hybrid sleeve having a neoprene front panel 1105 and back panel 1110. The neoprene panels may have an inside lining, such as a faux tin interior. Other lining materials may be used, such as rubber, foams, or other cushioning materials (see below for listing of materials). The neoprene panels may be laminated to the inside lining. The neoprene panel may also have exterior or interior pockets (not shown) to hold additional items. The case may also include rings, loops, eyes, or other attachment mechanisms (not shown) for a strap such as a shoulder strap.

In some embodiments, an EVA protective frame 1115 is positioned between the panels. The frame preferably provides 360 degrees of protection. A recess 1120 along the EVA frame holds the neoprene panels in place for stitching. In some embodiments, the neoprene panels are attached to the EVA frame by stitching. The EVA frame has a tab cut out 1128 that is positioned opposite a tab 1129 on the front neoprene panel.

On a side for the opening of the sleeve, the EVA frame includes recesses 1130 for magnets 1135. There may, for example, be three magnets recesses for three magnets. Fit some embodiments, a polycarbonate (PC) or neoprene (or other fabric or material such as nylon or polyester) panel 1140 may preferably cover the magnet recesses. This panel may be relatively rigid. There may also be a fabric or other material that is attached (not shown) to the panel covering the magnets. This fabric or material may be a lining material that is glued to the panel to help prevents scuffing or scratching of the portable electronic device by the case.

FIGS. 12A-12C show front, side, and bottom views of the EVA frame. The frame has a recess along the EVA frame to hold, the neoprene panels in place for stitching. The frame has recesses for magnets. In these embodiments, there are four recesses for up to four magnets. In various embodiments, there may be any number magnets, such as one, two, three, four, or more.

Magnets do not need to be placed in every recess. If desired, three magnets may be used in any three of the four recesses shown in FIG. 12A. Then one recess would remain empty. Alternatively, two magnets may be used and placed in any two of the four recesses.

Further, the number of recesses and magnets or their sizes or areas, or both, may depend on the sleeve or case design, in particular on the size of the opening. For larger or wider contents (e.g., a notebook as compared to a tablet), the side opening of the sleeve opening will generally be larger. As the opening becomes larger or longer, more magnets may be used for magnetic latching of the opening. For example, more magnets will be typically used for an opening along the longer side edge than an opening on the shorter side edge.

In some embodiments, sleeves for tablets (e.g., iPad Air® and iPad mini®) have a total of six magnets, three for the frame and three for the front neoprene panel. Sleeves for notebook computers (e.g., MacBook®) may have a total of eight magnets, four for the frame and four for the front neoprene panel. The frame in FIG. 12A is an example for a notebook while the frame in FIG. 11 is an example for a tablet.

Referring to FIG. 12B, a side (e.g., the shorter side) of the sleeve may optionally include a debossed logo (e.g., a debossed leaf logo) to indicate a branding or manufacturer of the sleeve. The logo may alternatively be omitted.

In some embodiments, one or more magnetic latches is used to secure the opening. In other embodiments, other types of latches or fasteners may be used to secure the opening. Some examples of other mechanisms include zippers, hinges, snaps, buttons, hooks, bands, spring latches, cam latches, hook and loop (e.g., Velcro™ by Velcro Industries B.V.), and many others. As an example, one side of the latch (e.g., positioned on the frame) may be a hook (or hook strip) while the other side (e.g., positioned, on the panel) may be a loop (or loop strip), or vice versa.

Additionally, one or more latches may be along a single side of the case, such as the shorter side of the rectangular case, the longer side of the rectangular case, a combination of a shorter side and a longer side, a combination of longer side and portions of two shorter sides, any three sides, or all four sides, or any combination thereof.

Referring to FIG. 12A, the structure of frame 1205 (which may be referred to as a frame border) has four sides, a first side, second side, third side, and fourth side. The first side is adjacent to the second and fourth sides, and opposite to the third side. The second side is adjacent to the first and third sides, and opposite to the fourth side. The second side is longer than the first side. These sides of the frame border surround an open space 1223 which forms a compartment into which a portable electronic device may be placed.

Figure 12D:
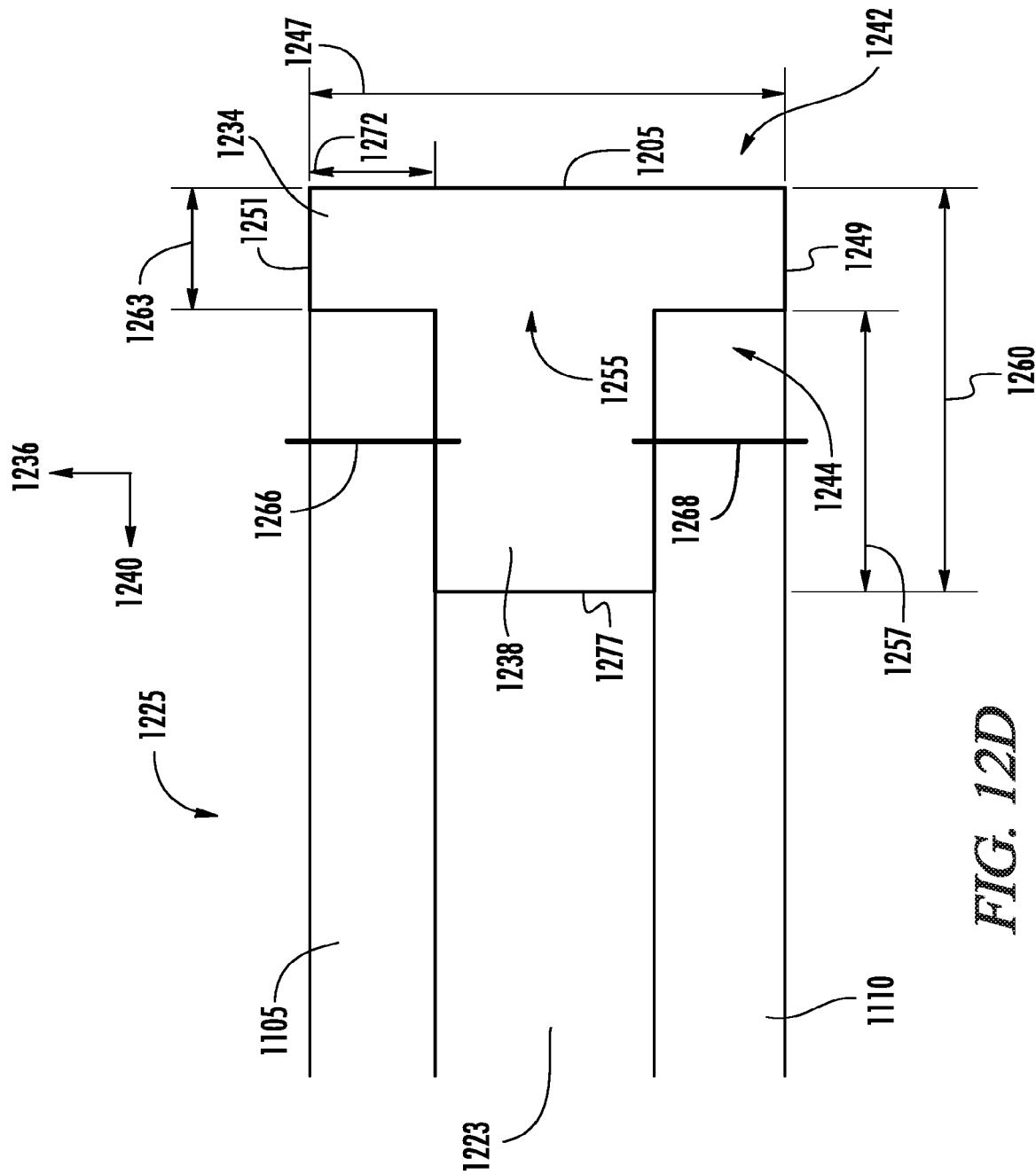
FIG. 12D shows a cross section of a side of an embodiment of the frame.

FIG. 12D shows a cross section of the frame along a line 1225-1225. Cross sections of the frame along lines 1227-1227 and 1229-1229 will be similar to the cross section along line 1225-1225. For example, the cross sections along line 1225-1225 and 1229-1229 will be mirror images of each other. Line 1225-1225 is transverse to line 1227-1227.

The cross section of the frame is T-shaped, having a first portion 1234 extending in a first direction 1236 and a second portion 1238 extending in a second direction 1240 that is transverse to the first direction. The first portion has an exterior side 1242 (which may be referred to as a bumper) and an interior side 1244. The first portion has a first length 1247 from a first end 1249 to a second end 1251 in the first direction.

The second portion is connected to the interior side of the first portion at a point 1255 between the first and second ends. The second portion extends in the second direction away from the first portion a second length 1257. A length 1260 of the entire cross section includes length 1257 and a thickness 1263 of the first portion. This length can be also referred to as a frame border width.

FIG. 12D also shows panels 1105 and 1110 attached to the frame. In some embodiments, panel 1105 is attached to the frame via stitching 1266 on one side of the frame, and panel 1110 is attached to the frame via stitching 1268 on the other side of the frame. The stitching is positioned along length 1260 of the second portion. As discussed above, panels 1105 and 1110 may alternatively be attached to the frame by other techniques. Typically, the attachment means (e.g., glue or adhesive) will also be positioned along length 1260 of the second portion.

A distance 1272 between the second portion and end 1251 of the first portion provides a recess for panel 1105. As such, after panel 1105 is attached to the frame, a top of panel 1105 (e.g., the exterior surface) will be flush or almost flush with end 1251 of the frame. In some embodiments, the top of the panel is slightly below (e.g., slightly lower) or slightly above (e.g., slight higher) end 1251 of the frame.

Similarly, the other side of the frame has a recess for panel 1110. Panel 1110 is typically the same thickness as panel 1105. As such, a distance between end 1249 and the portion 1238 will be the same as distance 1272. However, different panel thicknesses may alternatively be used on the two sides. In such embodiments, the distance between an end of the first portion and the second portion may be adjusted to accommodate the panel thickness to ensure the exterior surface of the panel is approximately flush with the end. The distances between the end and the second portion may be different on different sides.

An end 1277 of the second portion has a relatively flat surface, rather than a pointed surface. The device placed inside the case will have its sides abutted or placed against end 1277. The flat surface (e.g., with its relatively larger surface area) avoids formation of a high pressure point (e.g., a sharper point with relatively less surface area) that could damage the device during impact.

Instead of a flat surface, the shape of end 1277 may be designed to match the contours of the device for which the case is designed. For example, if the edge of the device is wedge shaped, the shape of end 1277 will be reverse wedge shaped. If the edge of the device is rounded, the shape of end 1277 will be reverse rounded or concave.

Figure 12E:
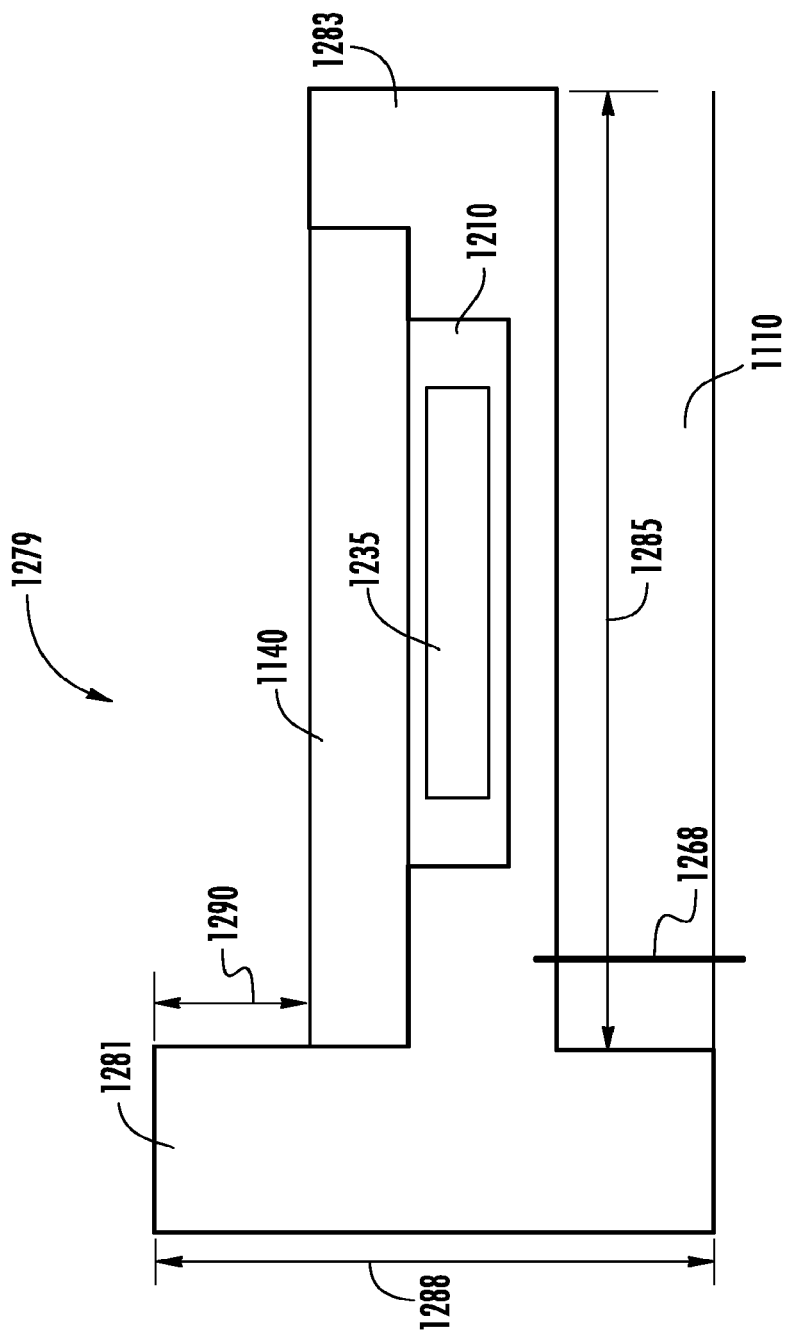
FIG. 12E shows another cross section of a side of an embodiment of the frame.

FIG. 12E shows a cross section of the frame along a line 1279-1279. This cross section is for the frame edge that forms the opening for the sleeve. This cross section is similar to the cross section along line 1225-1225 in FIG. 12D, but the panel 1105 is not fixedly attached to the frame edge by, for example, stitching or glue.

Cross section 1279 has a first portion 1281 and a second portion 1283. Second portion 1283 is different from second portion 1238 because the frame includes a recessed region 1210 which is for a magnet 1135. Recessed region 1210 is covered by magnet cover 1140 which holds the magnet in place.

In some embodiments, to accommodate the magnet, a length 1285 may be longer than length 1257. A larger magnet having greater surface area will provide more magnetic attractive force to hold the opening closed, especially during impact.

In other embodiments, length 1257 may be the same as or longer than length 1285. For example, length 1257 may be the same as or longer than length 1285. This will increase the shock absorption capability of the sides having a longer length 1257. Further, length 1285 may then be shortened to the same or less than length 1257. A different latching technology may be used so that magnets are not needed so as to allow for a shorter length. Other embodiments may have any combination of lengthening or shortening of length 1257 or 1285, or both.

In some embodiments, a height 1288 of the first portion along, the opening side edge is greater than a height 1247 along a side without the opening. This allows a greater recess length 1290 (as compared to length 1272) to accommodate the magnetic latch of panel 1105. Thus, while panel 1105 is magnetically latched to frame 1205, the surface of panel 1105 at the opening side will be flush or almost flush with an end of the first portion of the frame.

In other embodiments, height 1247 may be the same as or greater than height 1288. Other embodiments may have any combination of increasing or decreasing of height 1247 or 1288, or both. A greater height accommodates thicker panel material while maintaining a flush profile between the panel and frame edging. Generally greater higher also allows for greater shock absorption since there is more frame material to dissipate impact energy.

FIG. 12F shows a cross section of a magnetic latch of a panel along a line 1292-1292 (see FIG. 7). A magnet 1294 is attached to panel 1105 to firm the magnetic latch. There may also be a magnet holder 1295 to position the magnet on panel 1105. A magnet cover 1296 covers magnet 1294 and holder 1295 and holds the magnet and holder in place on an interior surface of panel 1105. The magnet may be attached by stitching or an adhesive. To form the pull tab for the opening, a portion 1298 is made longer.

Specific methods and techniques are described for making the disclosed case. However, it should be understood that the disclosure is not limited to the specific methods and steps presented. A method may have additional steps (not necessarily described in this application), different steps which replace some of the steps presented, fewer steps or a subset of the steps presented, or steps in a different order than presented, or any combination thereof. Further, the steps in other embodiments may not be exactly the same as the steps presented and may be modified or altered as appropriate for a particular application or based on the data obtained. Below is an example of a method for making a hybrid frame sleeve case.

1. An EVA frame, such as shown in FIG. 11 or 12A-12C, is formed by an injection molding process or other process used to form polymer materials. The frame has a shape that is the shape of the case. In some embodiments, the frame has a rectangular shape, two longer sides and two shorter sides, and rounded corners. The frame may also be referred to as a gasket bumper or bumper frame.

2. A rigid polycarbonate or neoprene (or other fabric or material such as nylon or polyester) panel, a cover for the magnets of the frame, is formed.

3. Front and back neoprene panels are formed. These may be cut and Formed from a larger sheet of neoprene. The patterns for the front and back neoprene panels may be different, such as where the front panel has a tab while the back panel does not. In other embodiments, the panels may use the same pattern. The front and back panels may also be referred to as front and back panel guards.

4. Magnets are placed in recesses of the frame. These magnets are secured in place by the magnet cover. The cover may be attached by glue, epoxy, welding, fusing, lamination, or other techniques for attaching polymers.

5. Magnets (or metal sheets) are attached to the front panel. A cover (such a piece 712 in FIG. 7) may be placed, over the magnets to hold them in place. These magnets or cover, or both, may be attached by stitching, glue, epoxy, welding, fusing, or other techniques. Typically, the number of magnets for the panel is the same as the number of magnets in the frame.

6. A lining material may be attached to the front and back panels. In some embodiments, the lining material is a faux fur. The lining material may alternatively be ether materials, including foams, that provide cushioning for the inside of the case.

7. The front and back panels are attached to recesses in the frame. These panels are attached to the frame along three sides, leaving one of the shorter sides unattached for an opening of the case. The neoprene panels may be attached by stitching (e.g., using thread that goes through the frame), glue, epoxy, welding, fusing, or other techniques for attaching the panels to the frame.

As described, in some embodiments, the frame is made from an ethylene vinyl acetate (EVA). EVA is the copolymer of ethylene and vinyl acetate. The weight percent of vinyl acetate usually varies from 10 to 40 percent, with the remainder being ethylene. EVA is often referred to as expanded rubber or foam rubber.

EVA is a polymer that is close to elastomeric materials in terms of softness and flexibility, but may still be processed like other thermoplastics. EVA has good clarity and gloss, low-temperature toughness, stress-crack resistance, hot-melt adhesive waterproof properties, and resistance to ultraviolet (UV) radiation. EVA provides cushioning or padding for the sides of the hybrid sleeve.

In other embodiments, polymers other than EVA may be used instead of or in combination with EVA. For example, the frame may be made of an elastomer, elastic polymer, elastomeric compound, thermoplastic elastomer (TPE), polyvinyl chloride (PVC), polyurethane, polystyrene, rubber, silicone, or other suitable polymers. An elastomer is a polymer with viscoelasticity (or "elasticity") and generally has a low Young's modulus and high failure strain compared with other materials.

The frame material may be a foam (e.g., polymer or other substance with trapped bubbles) that provides cushioning or padding. Some examples of foam include quantum foam, polyurethane foam (foam rubber), XPS foam, polystyrene, phenolic foam, or other manufactured foams. Other frame materials may include cork, carbonate, polycarbonate, thermoplastics, thermoplastic polyurethane (TPU), or any combination thereof. The frame materials may alternatively not be a foam or elastic like EVA, but instead have a hard or rigid panel to absorb impacts instead of the contents of the case. The hard panel or surface (e.g., polycarbonate) may crack, shatter, or fracture on impact to distribute the energy of the impact. In some embodiments, the cracked panels can be replaced with replacement panels. Alternatively, the entire case can be replaced after the impact-absorbing panels are spent due to an impact.

In some embodiments, the front and back panels are made of neoprene. Neoprene, also known as polychloroprene, is a family of synthetic rubbers that are produced by polymerization of chloroprene. Neoprene provides cushioning and shock absorption for a portable electronic device protected by the disclosed case.

In other embodiments, the outer panels are made from other soft materials, such as fabric (e.g., cotton, wool, linen, polyester, microfiber, or fabric blends), ballistic nylon, woven carbon fiber, thermoplastic elastomer (TPE) material via a mold, other polymers, or other suitable materials, in any combination. The fabrics may include fibers that are woven, nonwoven, or knitted. Other materials may be alternatively used, including silicone, rubber, and many other materials. Other examples of materials include vinyl, polyvinyl chloride (PVC), plastic, thermoplastic, cloth, leather, suede, artificial leather, synthetic leather, synthetic leather made of plastic (sometimes referred to as pleather), poromeric imitation leather, koskin, leatherette, carbon fiber, air mesh, polyurethane (PU), welded polyurethane film, nylon, and polyester, in any combination.

In some embodiments, the outer panels are made of nylon or polyester fabric that is environmentally friendly. The fabric may have a dope-dyed fiber, where the color originates from the addition of color chips during the process of polymerization. This avoids the dyeing process, which can causes unnecessary pollution and the release of greenhouse gases. A particular brand of dope-dyed fiber fabric is called Ecoya™ from LIBOLON. In some embodiments, the fabric for the panels may have a heathered pattern.

In some embodiments, the materials for the front and back panels are less rigid or more elastic than the frame. The soft panels (e.g., neoprene) may adapt or conform (e.g., stretch) to the surface and shape of the contents being held in the sleeve. The frame is less elastic and has less stretch than the panels. The frame provides a structure for absorbing impacts and protecting the contents of the sleeve.

In some embodiments, the frame structure is more shock absorbing than the panel material. To absorb shock, kinetic energy such as that generated during the impact against the case is turned into heat and absorbed by the material instead of transferring the impact energy to the device being protected by the case. This frame structure is more rigid than the panel material, which allows it to absorb more shock. The frame may be a foam. In such embodiments, the trapped bubbles in the foam will act like compressible springs to absorb the shock. After the shock has been absorbed, the frame elastically returns to its original shape (e.g., the bubbles in the foam expand back to their original shape).

The panel material may also be a foam, but the spring constant (according to Hooke's Law) for the compressible springs (bubbles) in the panel material is less than that for the frame. Thus, the panel material will not absorb as much kinetic energy as the frame.

Figure 13:
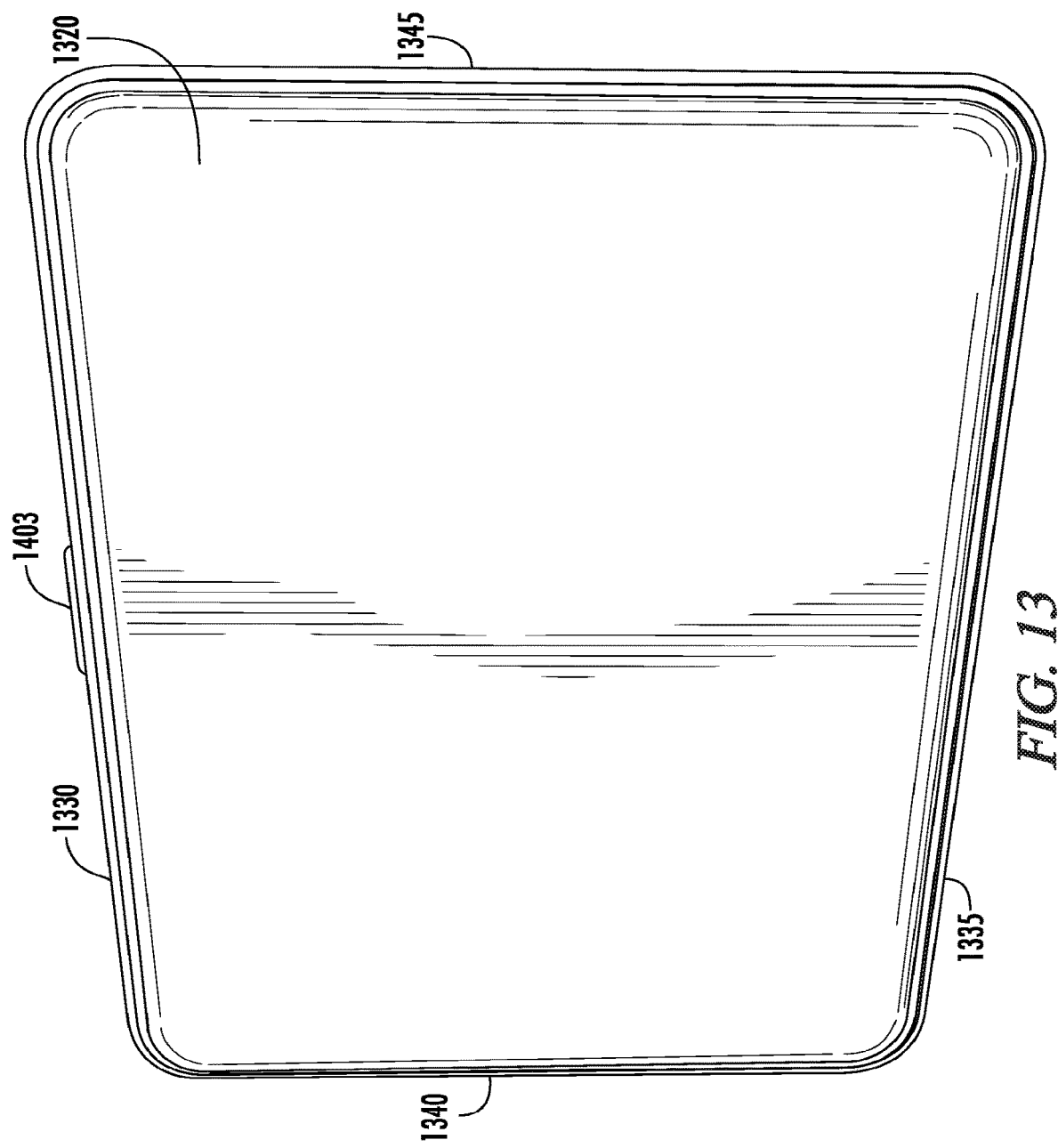
FIGS. 13-15 show an embodiment of the hybrid sleeve case.
Figure 14:
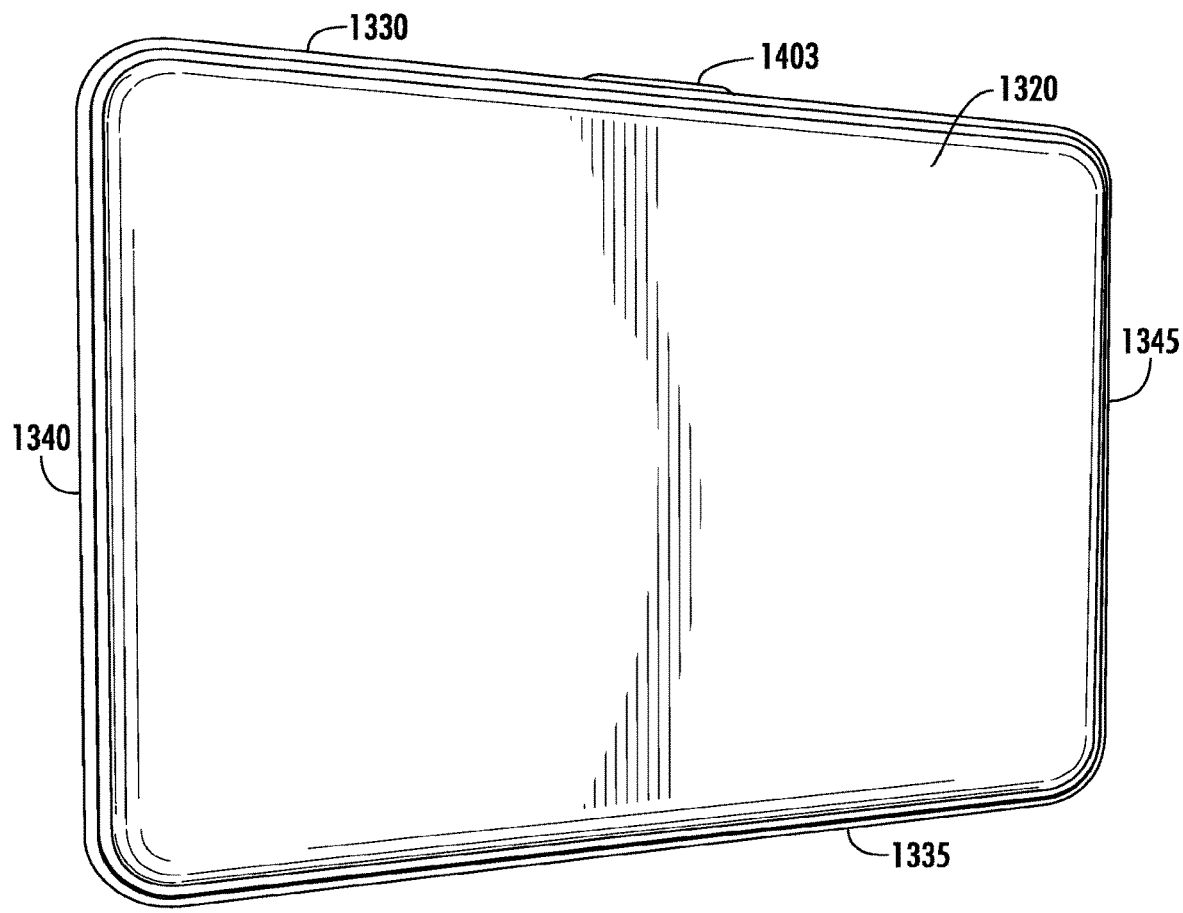
Figure 15:
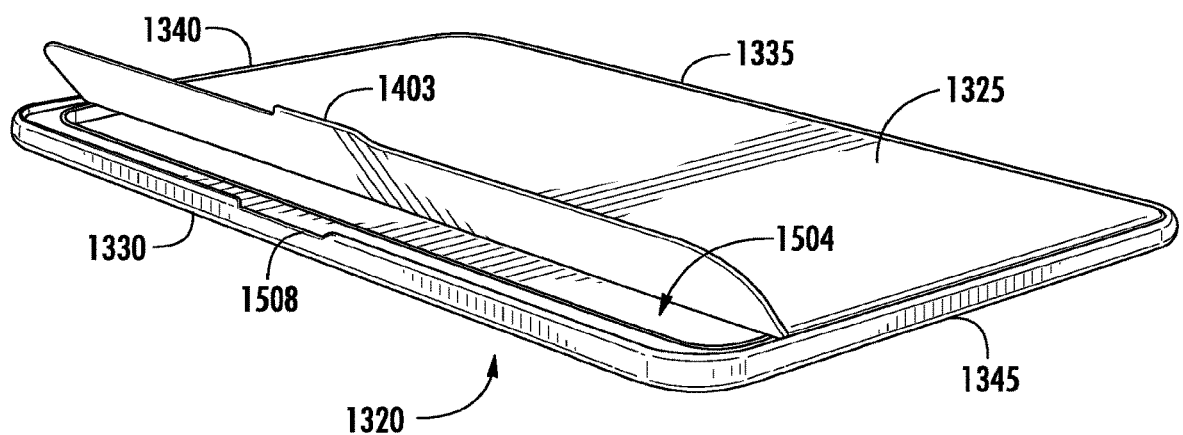

FIGS. 13-15 show another embodiment of a hybrid sleeve case. This embodiment is similar to the hybrid sleeve case described above. However, instead of having an opening on the shorter side edge of the case, the opening for this embodiment is on the longer side edge of the case. This embodiment has a front panel 1320, back panel 1325, longer sides 1330 and 1335, and shorter sides 1340 and 1345. Longer side 1330 has a tab 1403 and opening 1504. FIG. 15 shows opening 1504 in an open position. A user can pull tab 1403 to open the opening. When closed, tab 1403 is inserted into a tab cut out 1508.

Figure 16A:
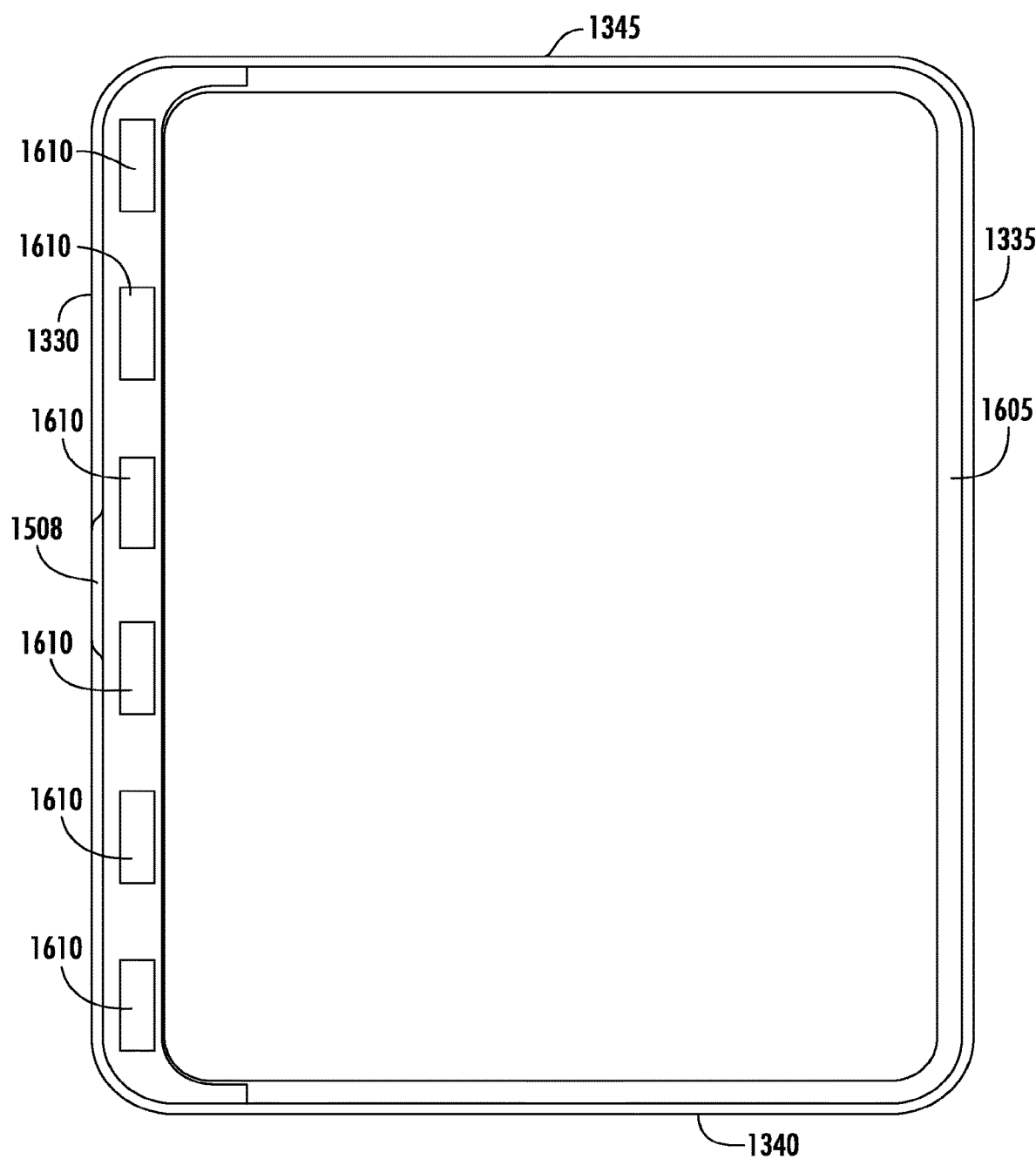
Figure 16F:
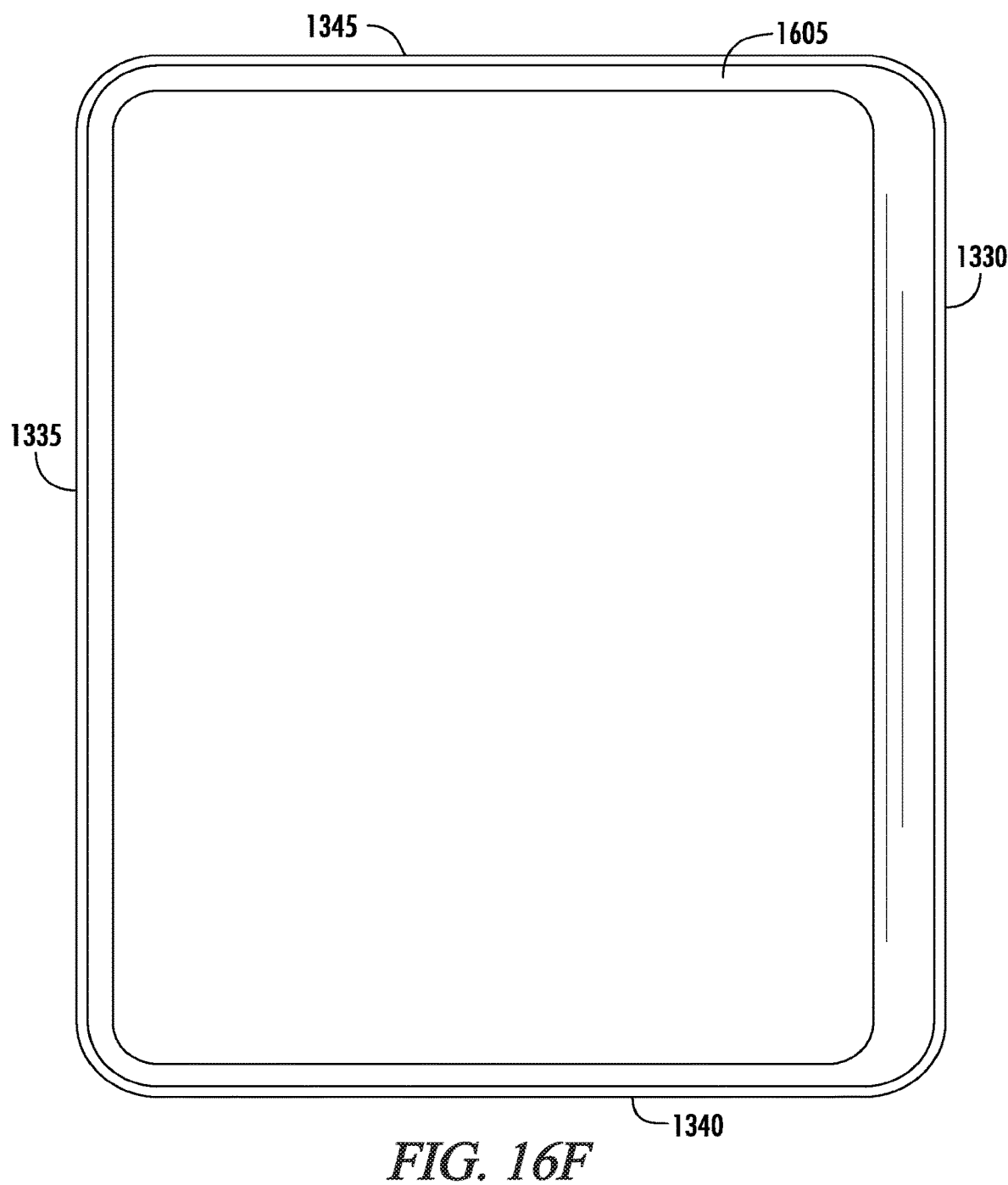

FIGS. 16A-16F show a frame 1605 for the hybrid sleeve case. This frame is similar to frame 1205 described in FIGS. 12A-12F above. FIG. 16A shows a first side of the frame and magnet recesses along a longer edge of the frame rather than along the shorter edge of the frame as in FIG. 12A. FIG. 16B shows a longer side edge of the frame where the opening is positioned. A tab cut out 1508 is also shown. FIGS. 16C-16D shows the shorter side edge of the frame. FIG. 16E shows a longer side edge of the frame that is opposite to the side edge shown in FIG. 16B. FIG. 16F shows a second side of the frame.

Figure 19:
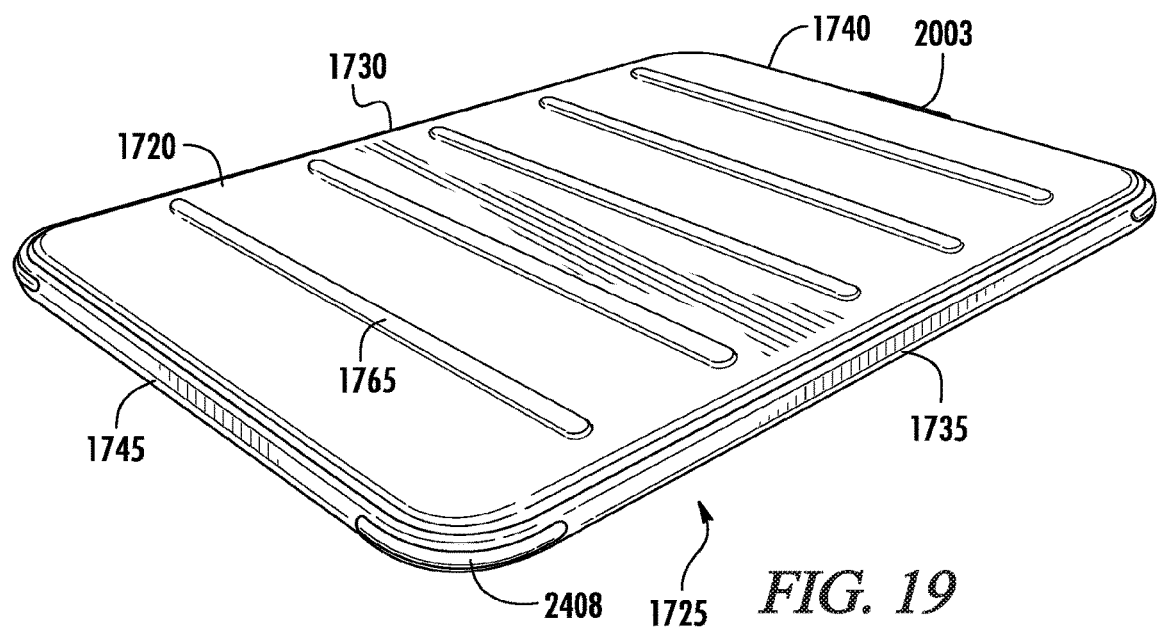
Figure 20:
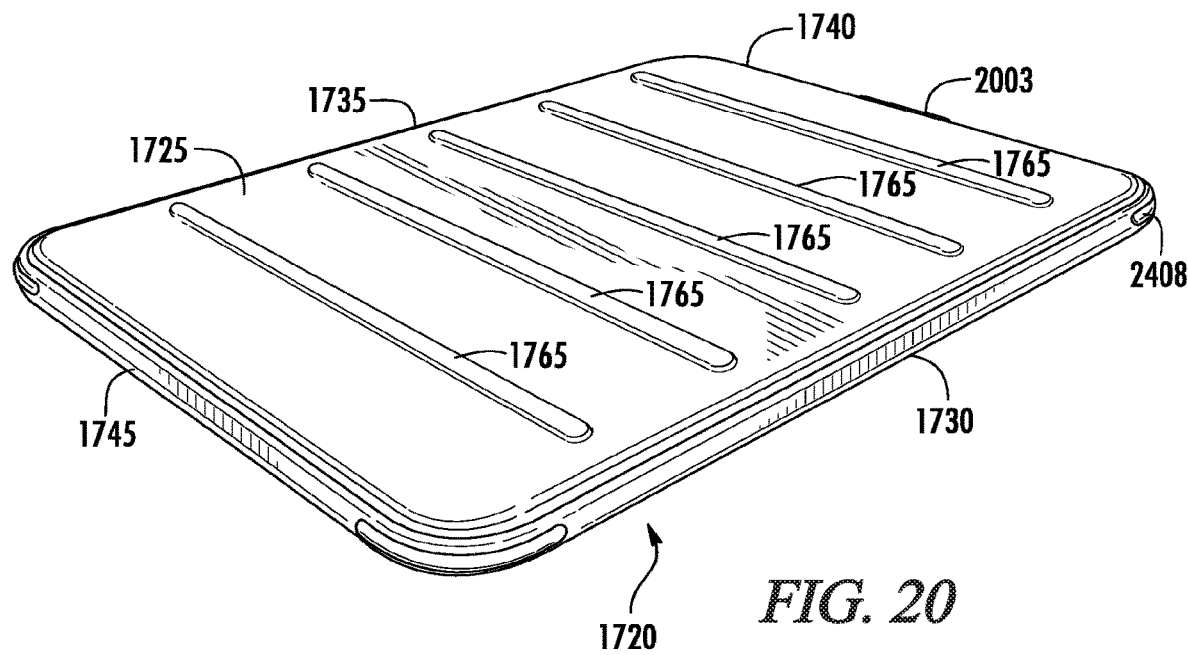
Figure 21:
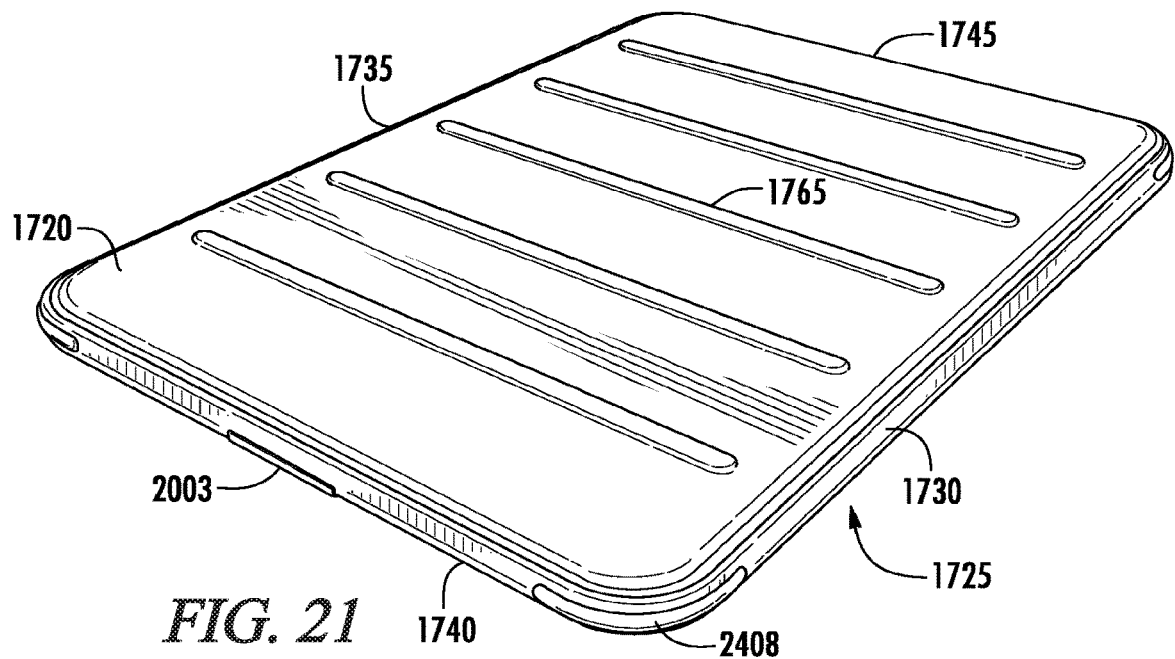
Figure 22:
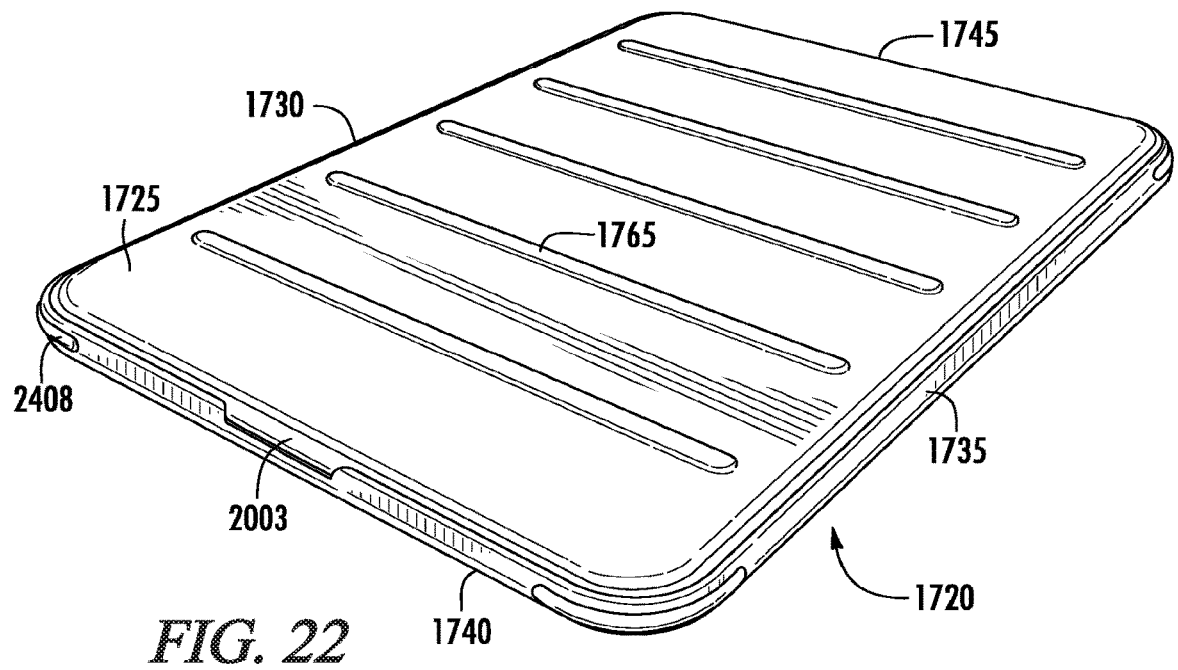
Figure 23:
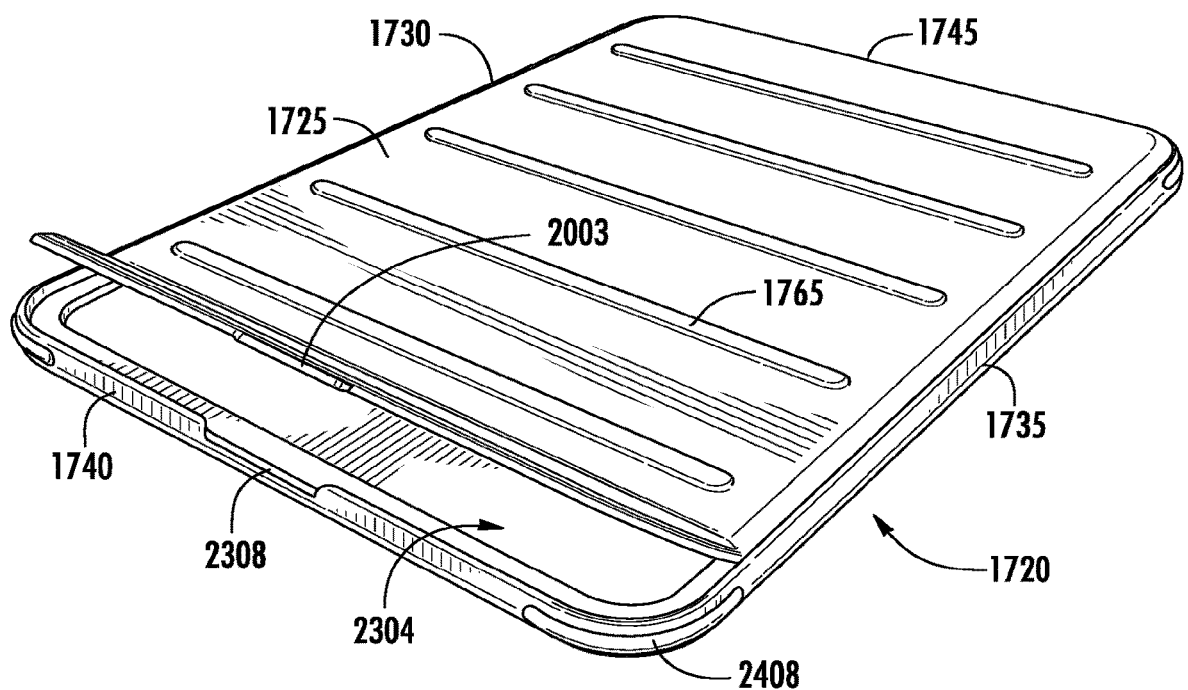

FIGS. 17-24 show an embodiment of the disclosed by frame sleeve case. The case has a front 1720, back 1725, sides 1730 and 1735, and sides 1740 and 1745 that are shorter than sides 1730 and 1735. Shorter side 1740 has a tab and opening. FIG. 17 shows a top view of the front side. FIG. 18 shows side 1730. FIG. 19 shows a perspective view of the front with side 1740 positioned forward. FIG. 20 shows a perspective view of the back with side 1735 positioned forward and with tab 2003. FIG. 21 shows a perspective view of the front with side 1730 positioned forward. FIG. 22 shows a perspective view of the back with side 1730 positional forward and with tab 2003. FIG. 23 shows a perspective view of the back with the opening 2304 lifted open and a tab cutout 2308.

Figure 24:
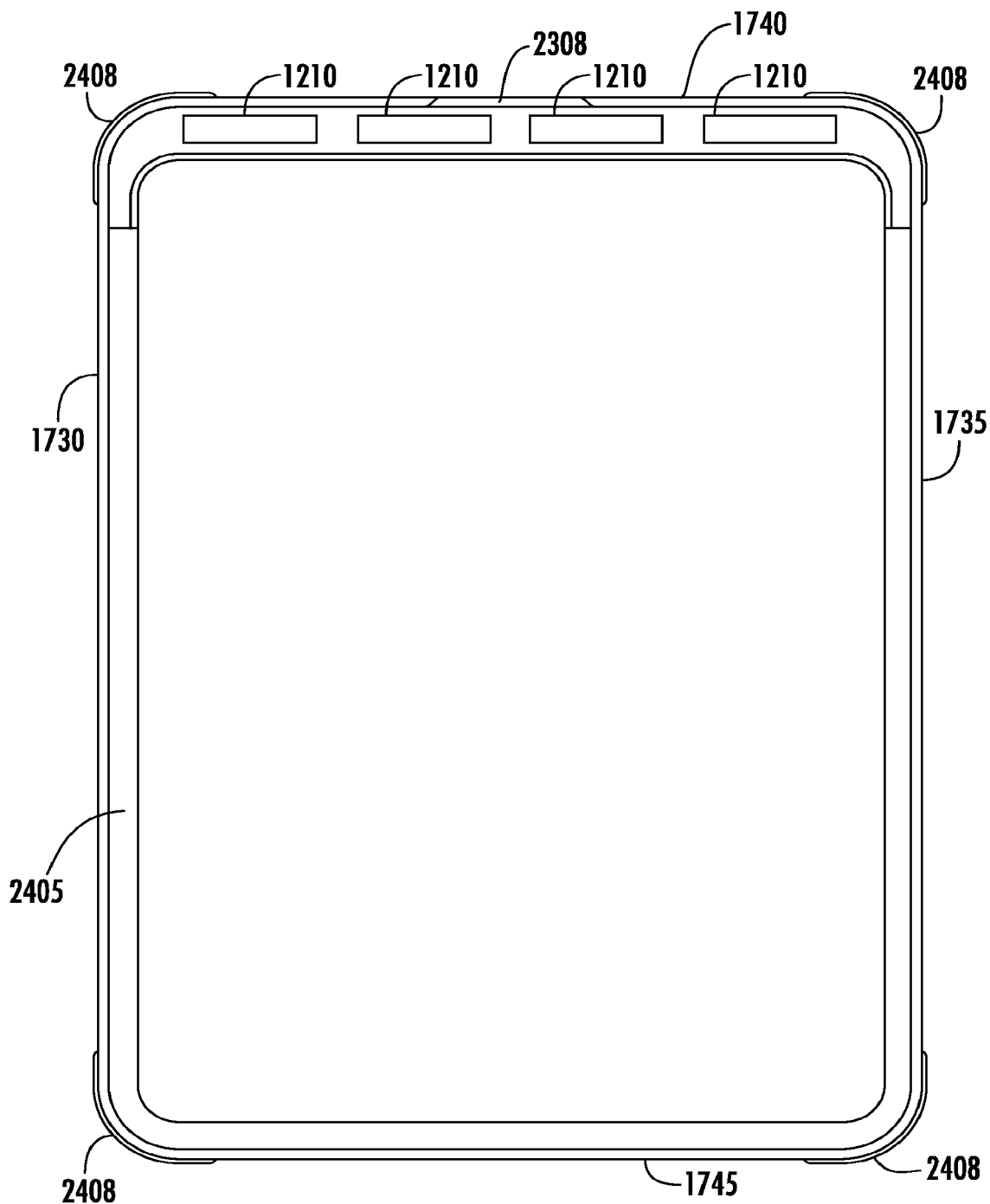

FIG. 24 shows an EVA protective frame 2405 for the hybrid sleeve case. Sides 1730, 1735, 1740, and 1745 of the hybrid case are formed by the EVA frame. As discussed above, such as for FIG. 12A, the frame has recesses 1210 for magnets. Additionally, EVA frame 2405 has reinforced corners 2408, where an additional layer is added to the EVA at the corner, or the EVA layer is created to have a thicker portion. The additional layer may be EVA or other materials that have been previously discussed for the EVA frame. The reinforced corners of this hybrid are visible in FIGS. 17-23. The reinforced corner may be referred to as a bumper or corner bumper. The corner bumpers may provide additional protection and cushioning for the corners of the case.

In some embodiments, corner bumpers are part of the mold for the EVA frame. In other embodiments, corner bumpers are attached to the EVA frame. The corner bumpers may be attached to the frame, for example, by gluing, fusing, or other methods.

In some embodiments, the corner bumpers are made of EVA. In other embodiments, the corner bumpers may also be made of PU, rubber, or other materials. The corner bumper may be made of the same material as the EVA frame. Alternatively, the corner bumper is made of a different material than the EVA frame.

While four corner bumpers are shown, there may be more or fewer bumpers. For example, each corner may have two corner bumpers. However, each corner does not have to have the same sized bumpers, the same number of bumpers, or use the same material for the bumpers.

In these embodiments, the front and back panels for frame 2405 have raised rails 1765. Like the corner bumpers, the raised rails 1765 may provide additional protection and cushioning for the case.

In some embodiments, the raised rails are attached to only the front panel of the case. In other embodiments, the raised rails are attached to only the back panel of the case. In other embodiments, the raised rails are attached to both front and back panels of the case.

The raised rails shown are rectangular prisms that approximately span the shorter side of the case. In other embodiments, the raised rails may be different shapes, such as cylinders and triangles. The raised rails may also be oriented such that they are attached like legs of a table.

Figure 25:
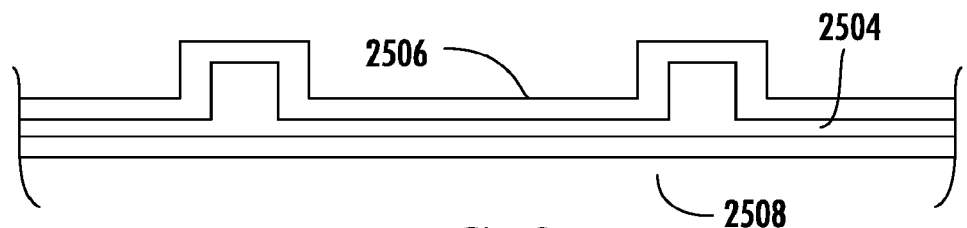
FIG. 25 shows a cross section of rails of a panel of an embodiment of the hybrid sleeve case.
Figure 26:
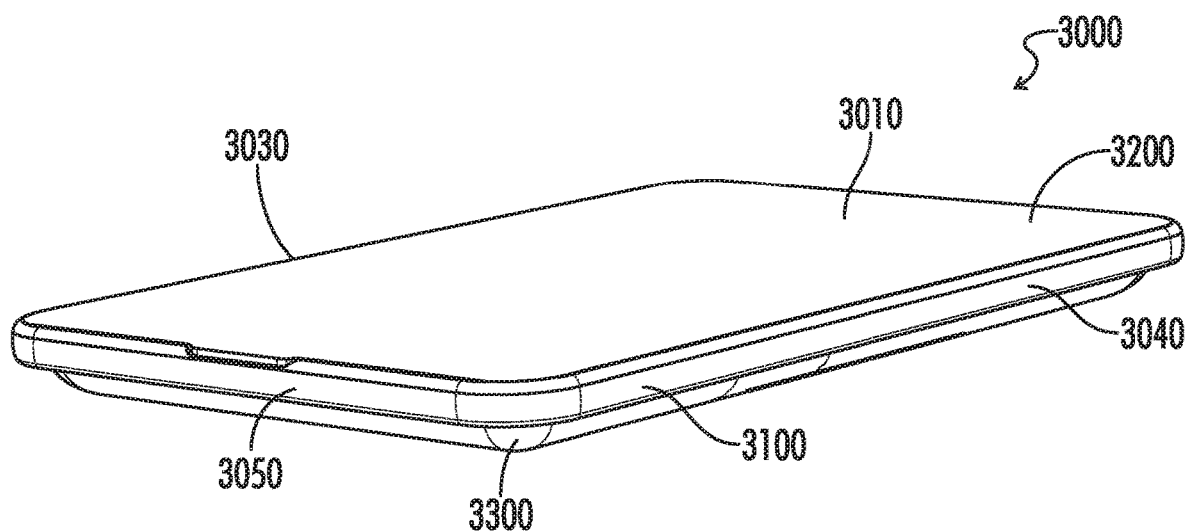
FIG. 26 is a front face perspective view rendering of an embodiment of the disclosed hybrid frame sleeve case with a charging system taken from the top end of the case.
Figure 27:
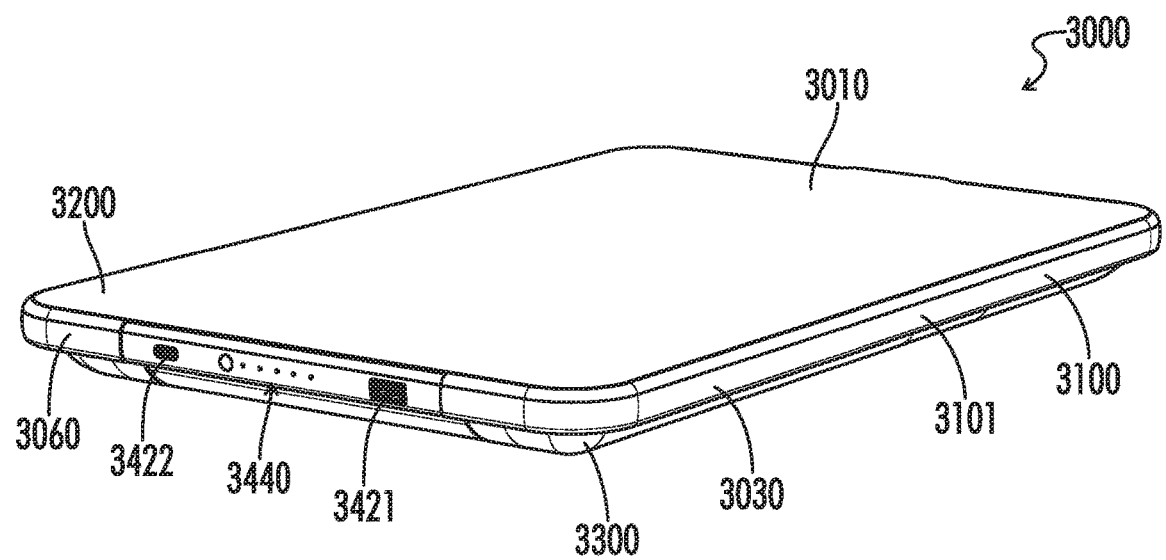
FIG. 27 is a front face perspective view line drawing of the embodiment depicted in FIG. 26 taken from the bottom end of the case.
Figure 28:
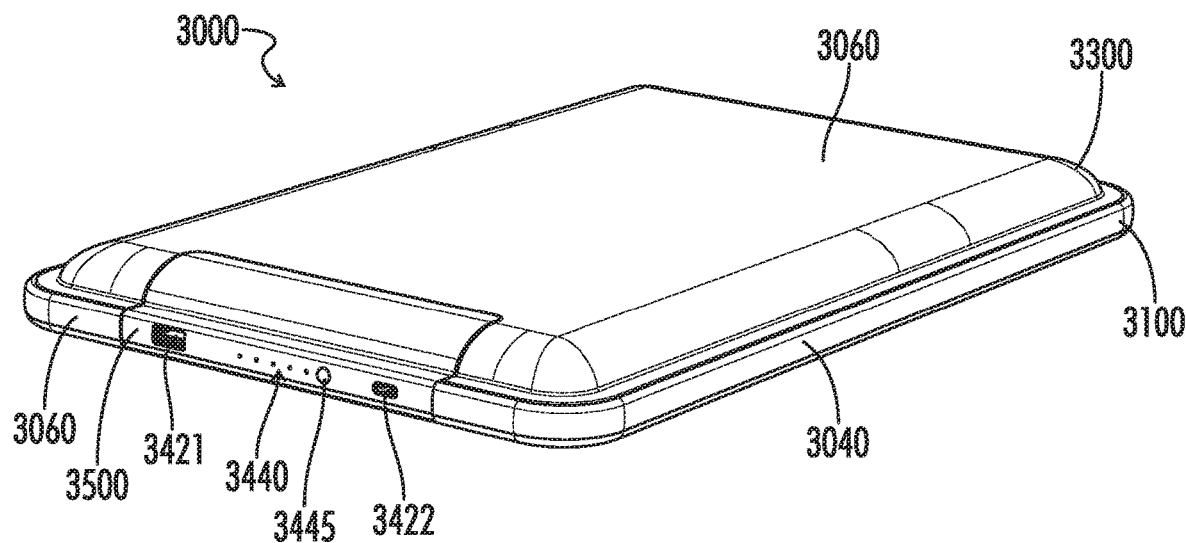
FIG. 28 is a back face perspective view rendering of the embodiment depicted in FIG. 26 taken from the bottom end of the case.
Figure 29:
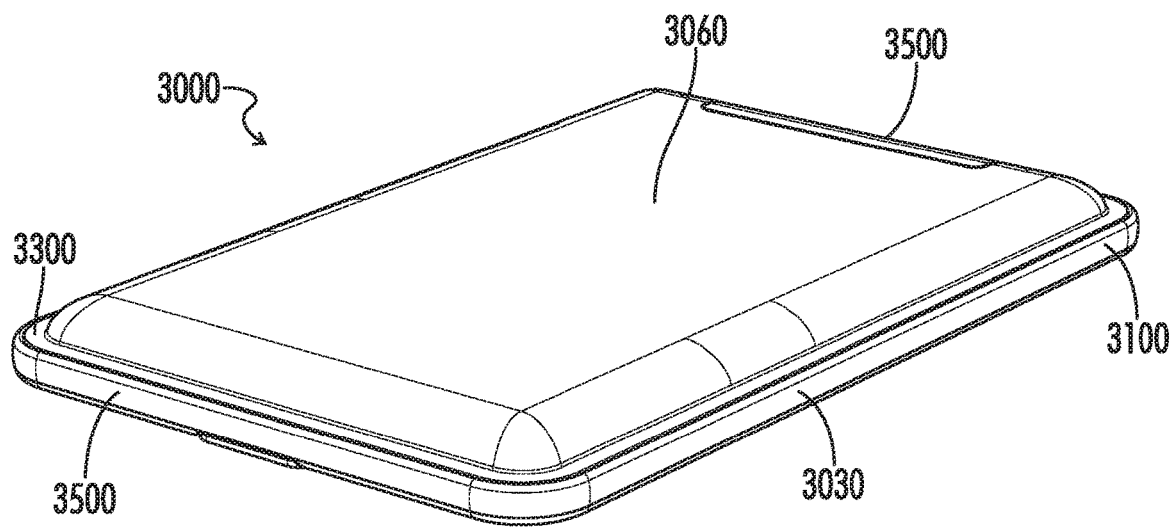
FIG. 29 is a back face perspective view line drawing of the embodiment depicted in FIG. 26 taken from the top end of the case.
Figure 30:
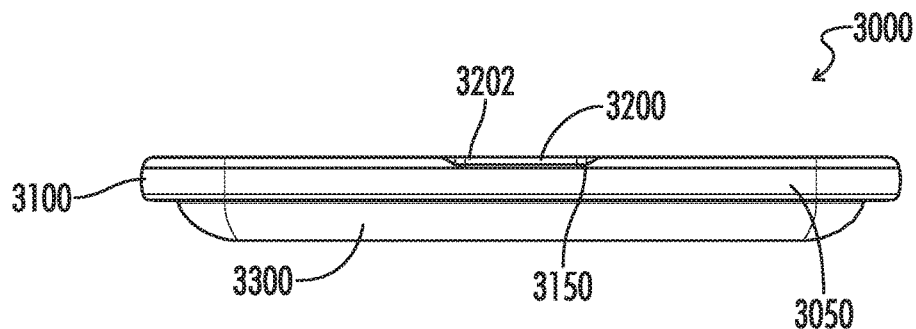
FIG. 30 is a top end side view line drawing of the embodiment depicted in FIG. 26.
Figure 31:
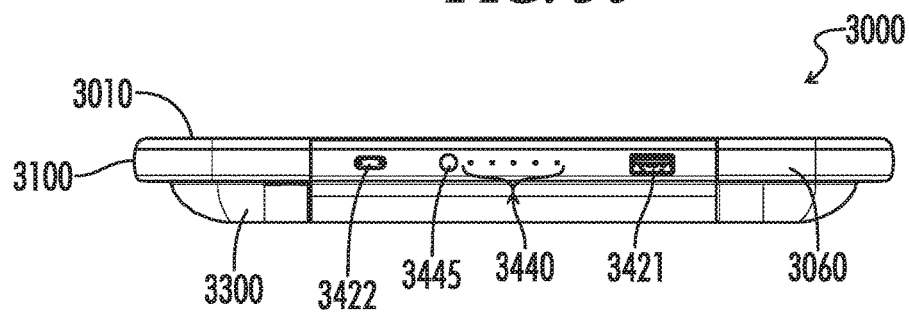
FIG. 31 is a bottom end view line drawing of the embodiment depicted in FIG. 26.
Figure 32:
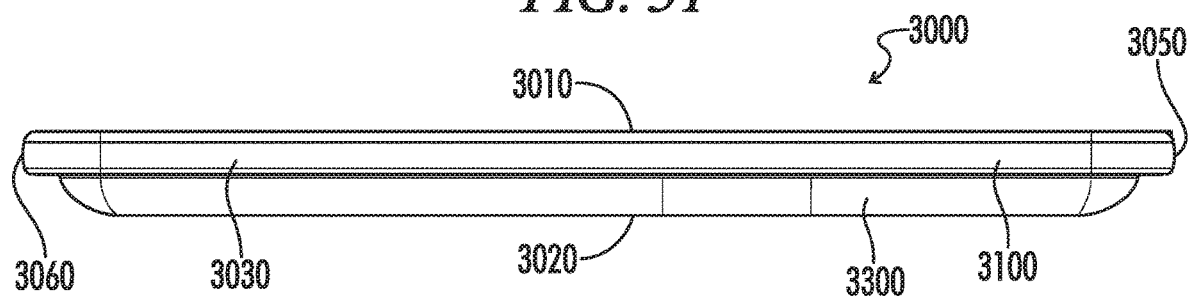
FIG. 32 is a left side view line drawing of the embodiment depicted in FIG. 26.
Figure 33:
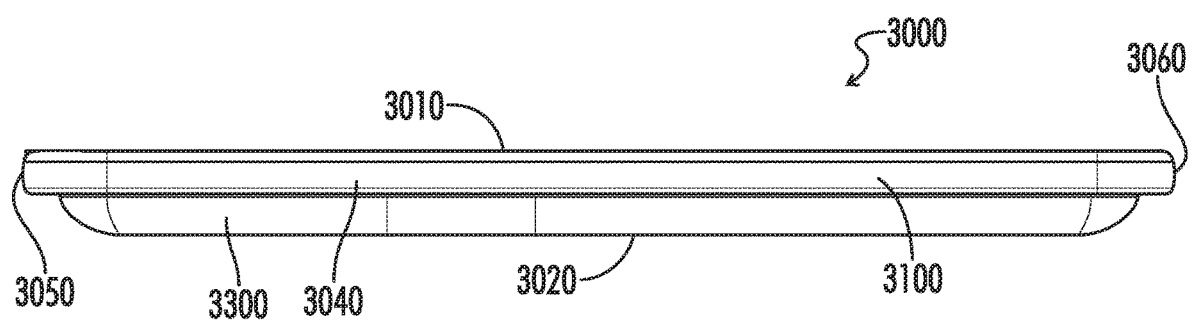
FIG. 33 is a right side view line drawing of the embodiment depicted in FIG. 26.
Figure 34:
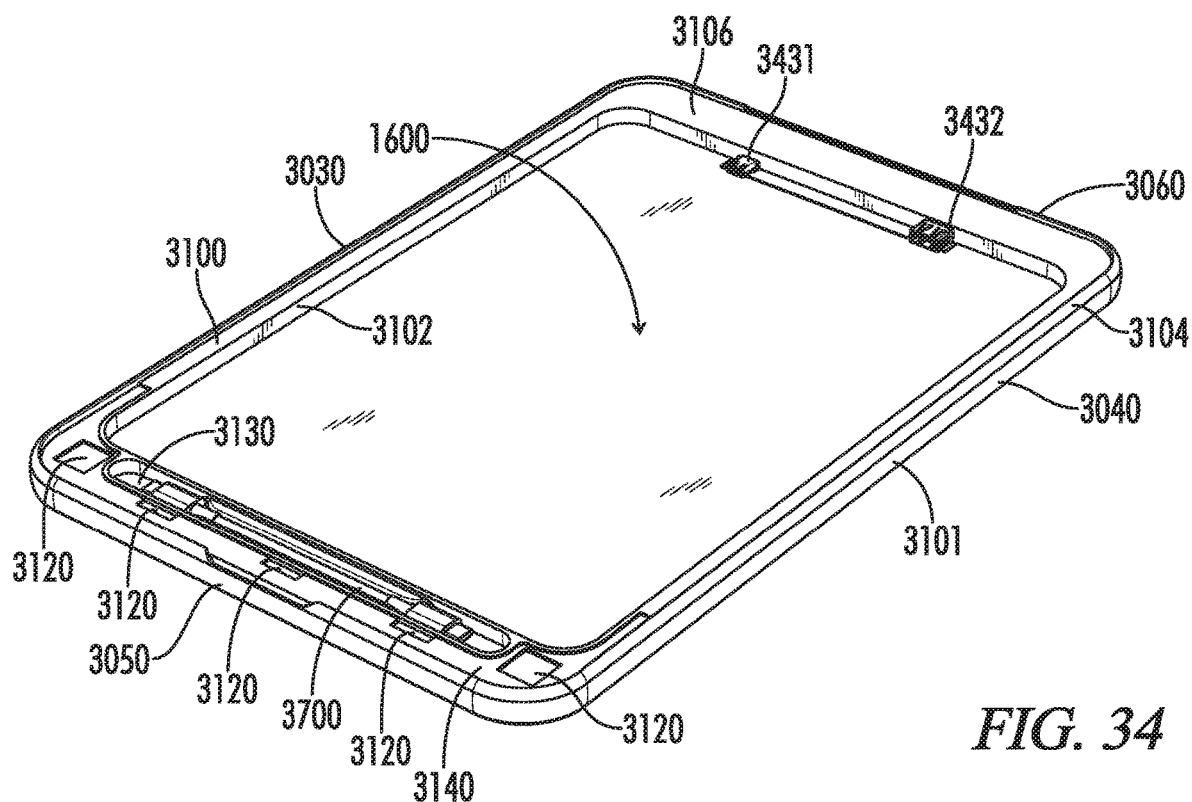
FIG. 34 is a front face perspective view line drawing of the embodiment depicted in FIG. 26 with the front Ewe side panel, magnet cover, and magnets removed to better illustrate the portable electronic device compartment, connector cable, and cable compartment, and the internal charging interfaces located on the periphery of the device compartment.

FIG. 25 shows a cross section of rails of a panel of an embodiment of the disclosed hybrid sleeve case. A rail structure layer 2504 is positioned between an exterior layer 2506 and interior layer 2508. The rail structure layer provides the rail structure. In some embodiments, the layers are laminated together. In other embodiments, the three layers are attached together by an adhesive. The rail structure may be made from a polymer material such as EVA and the exterior and interior layers may, be made from fabric, such as nylon or polyester, or a material such as neoprene.

Figure 42A:
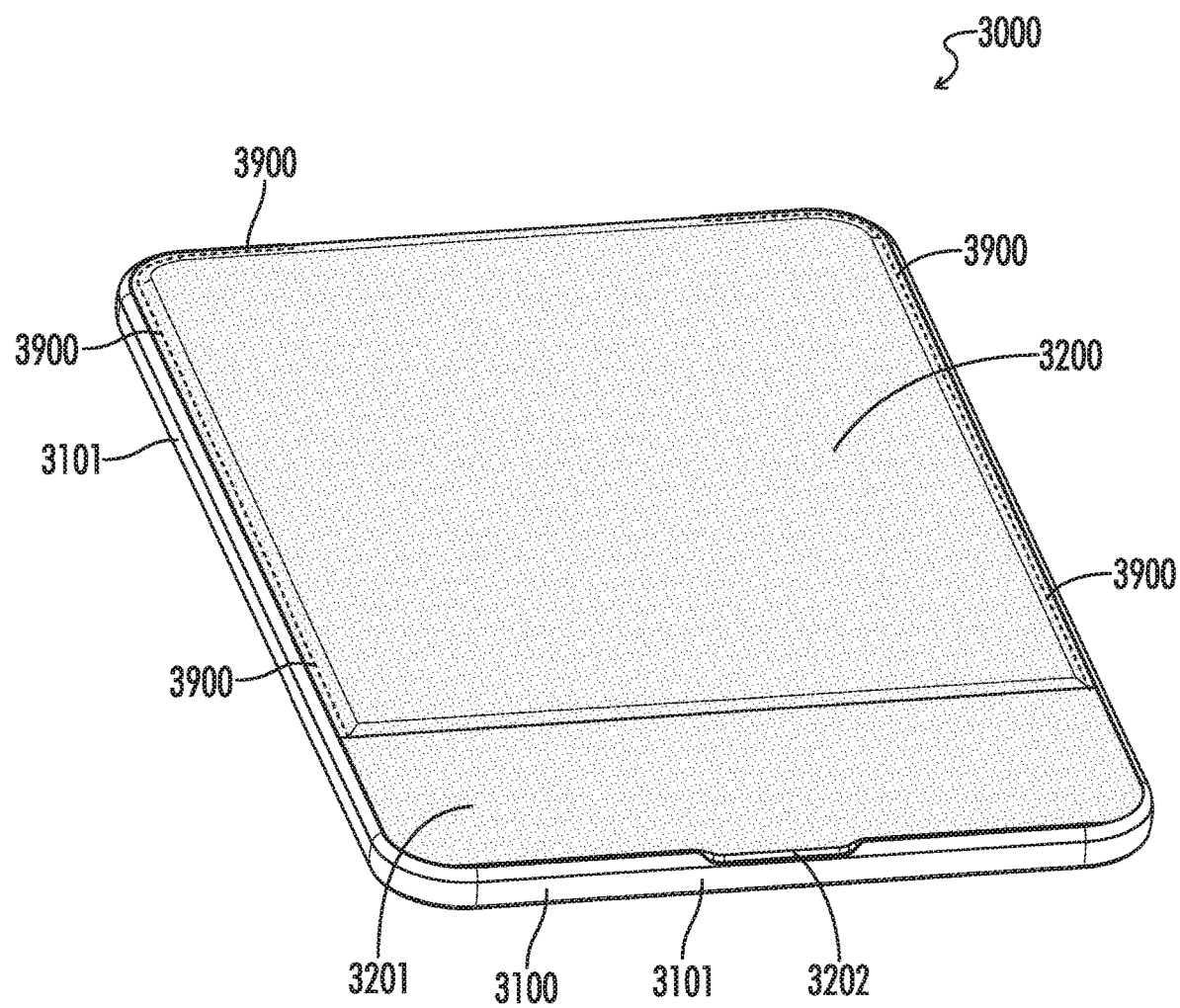
FIGS. 42A-G further illustrate the construction and operation of the embodiment illustrated in FIG. 26.
Figure 42B:
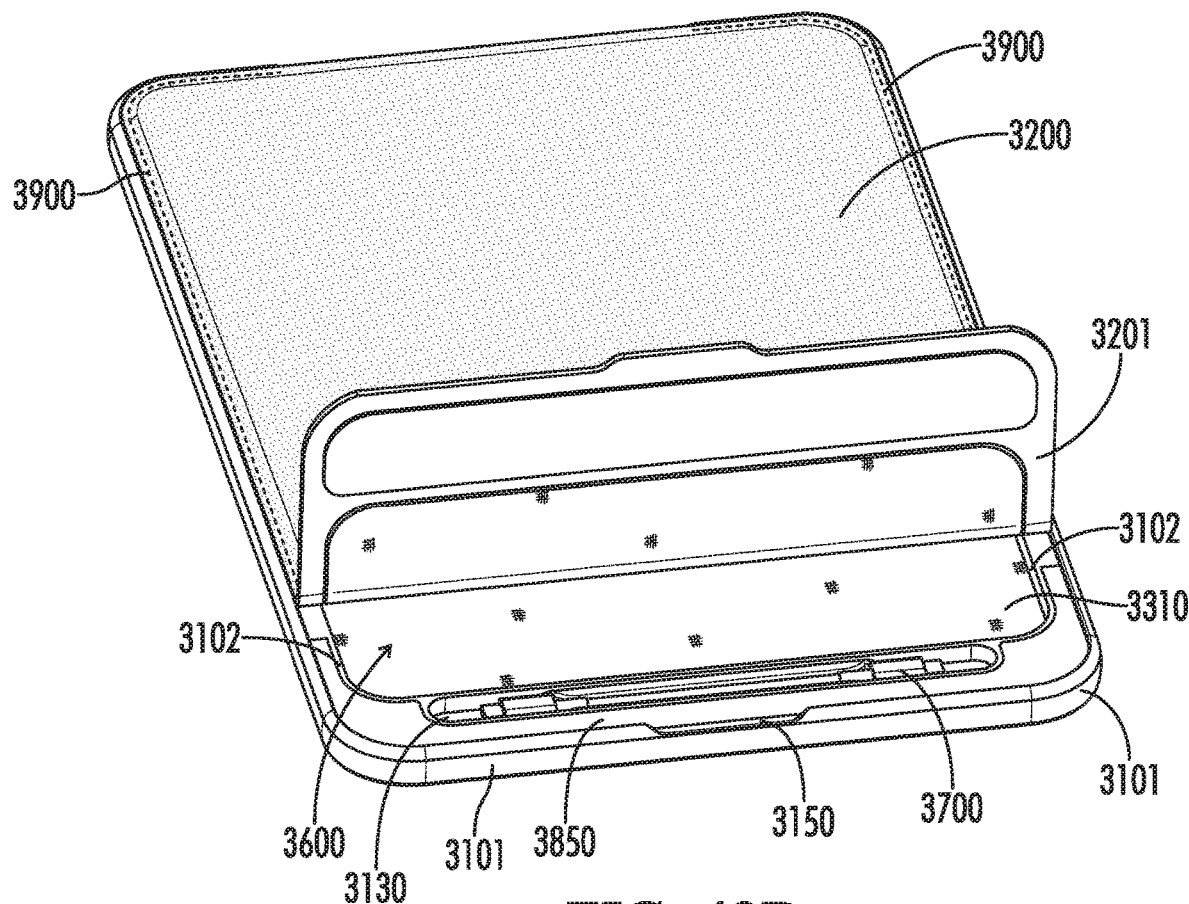
Figure 42C:
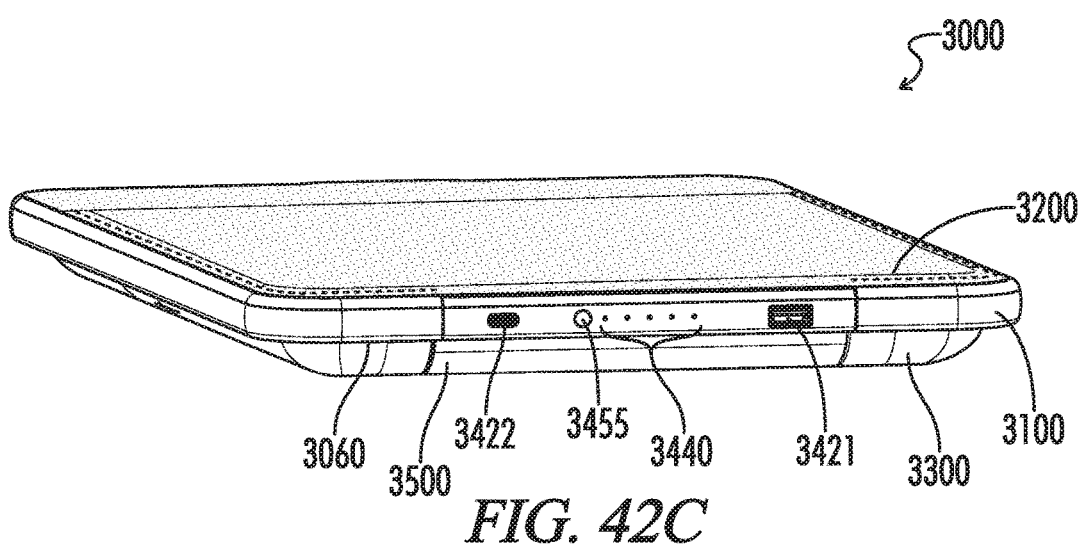
Figure 42D:
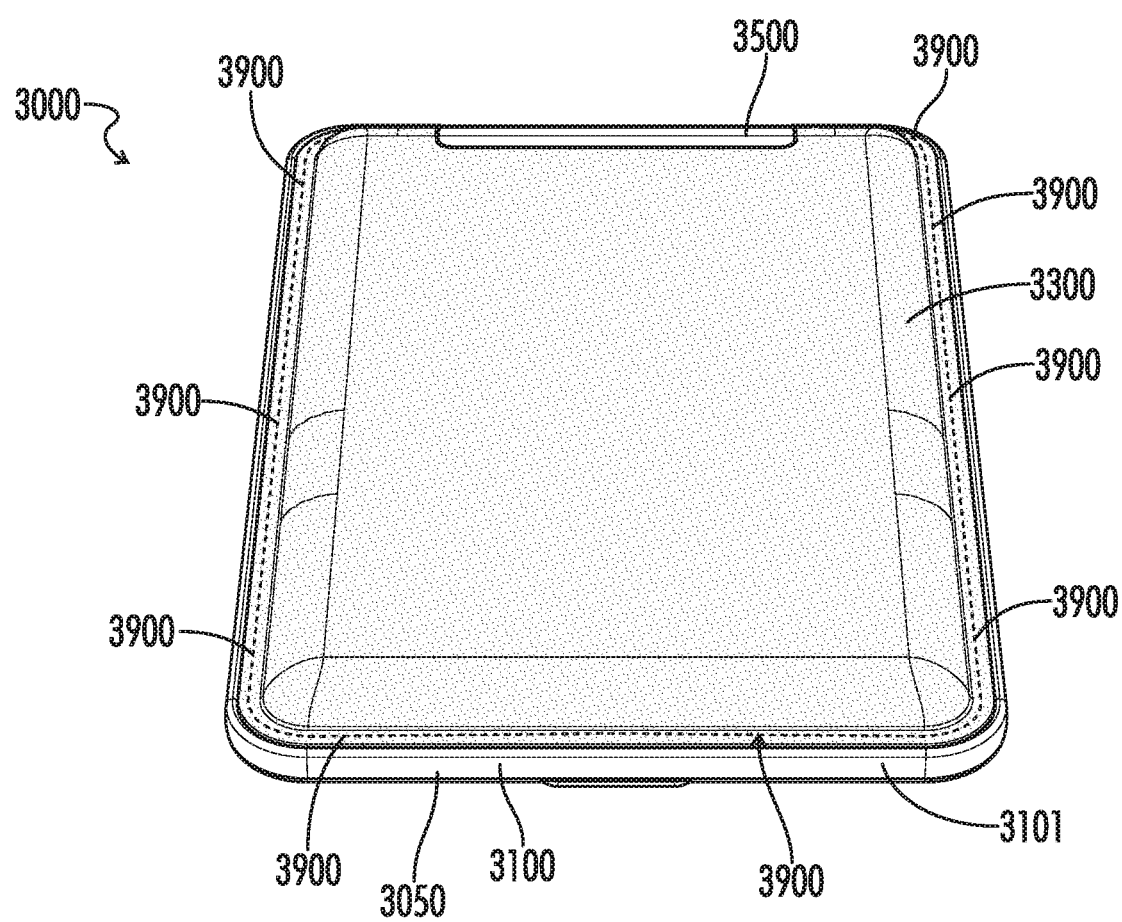
Figure 42E:
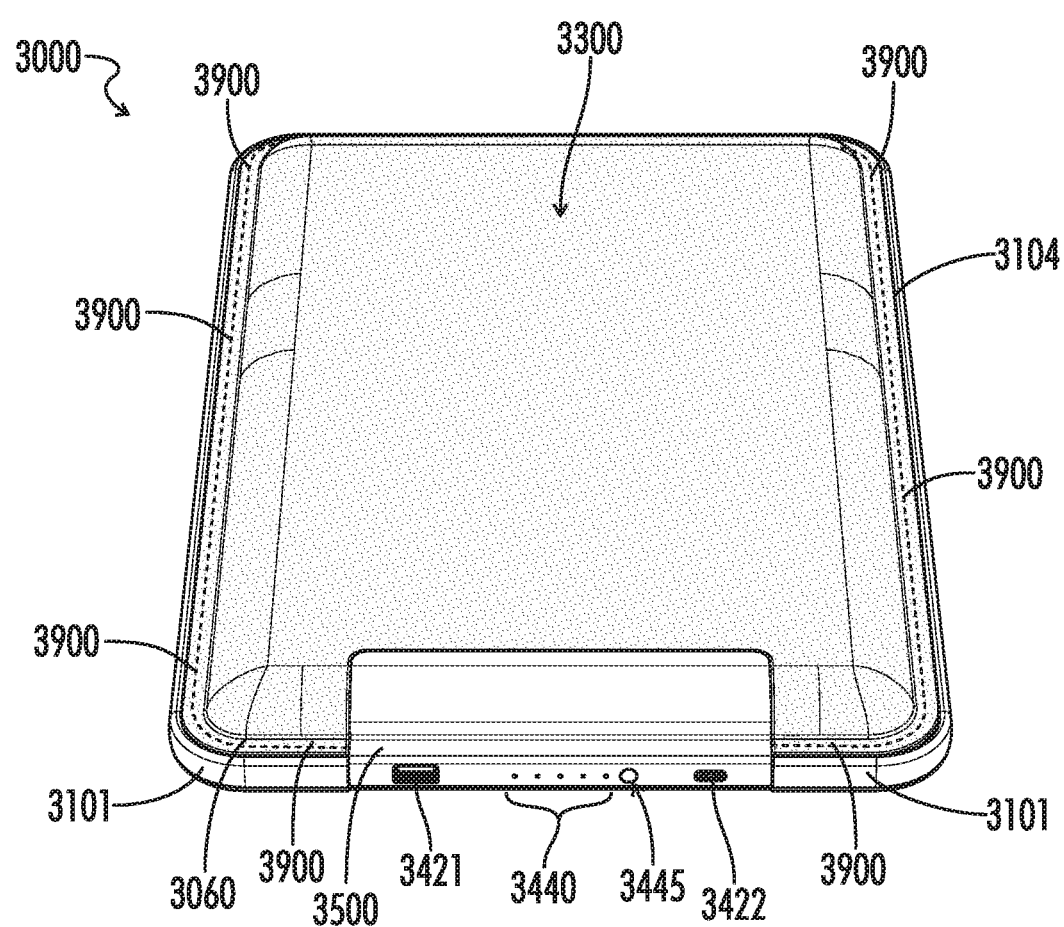
Figure 42F:
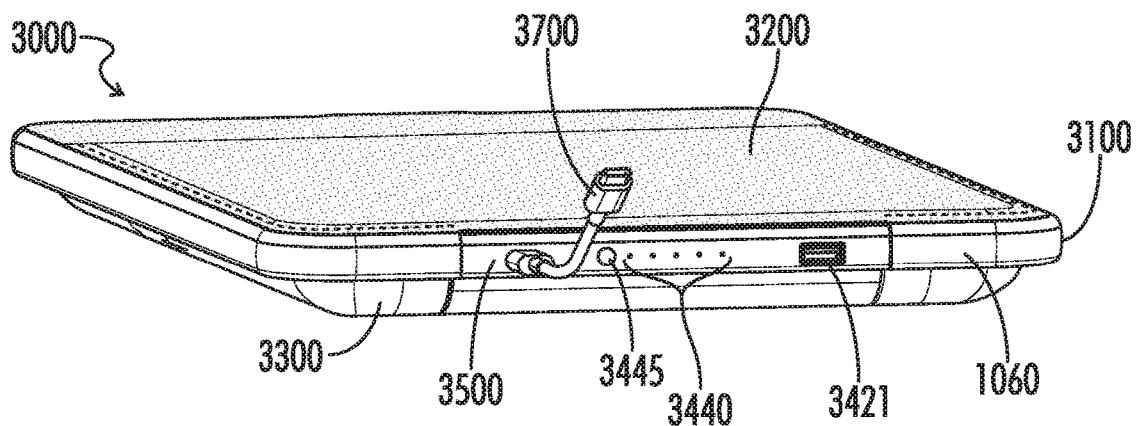
Figure 42G:
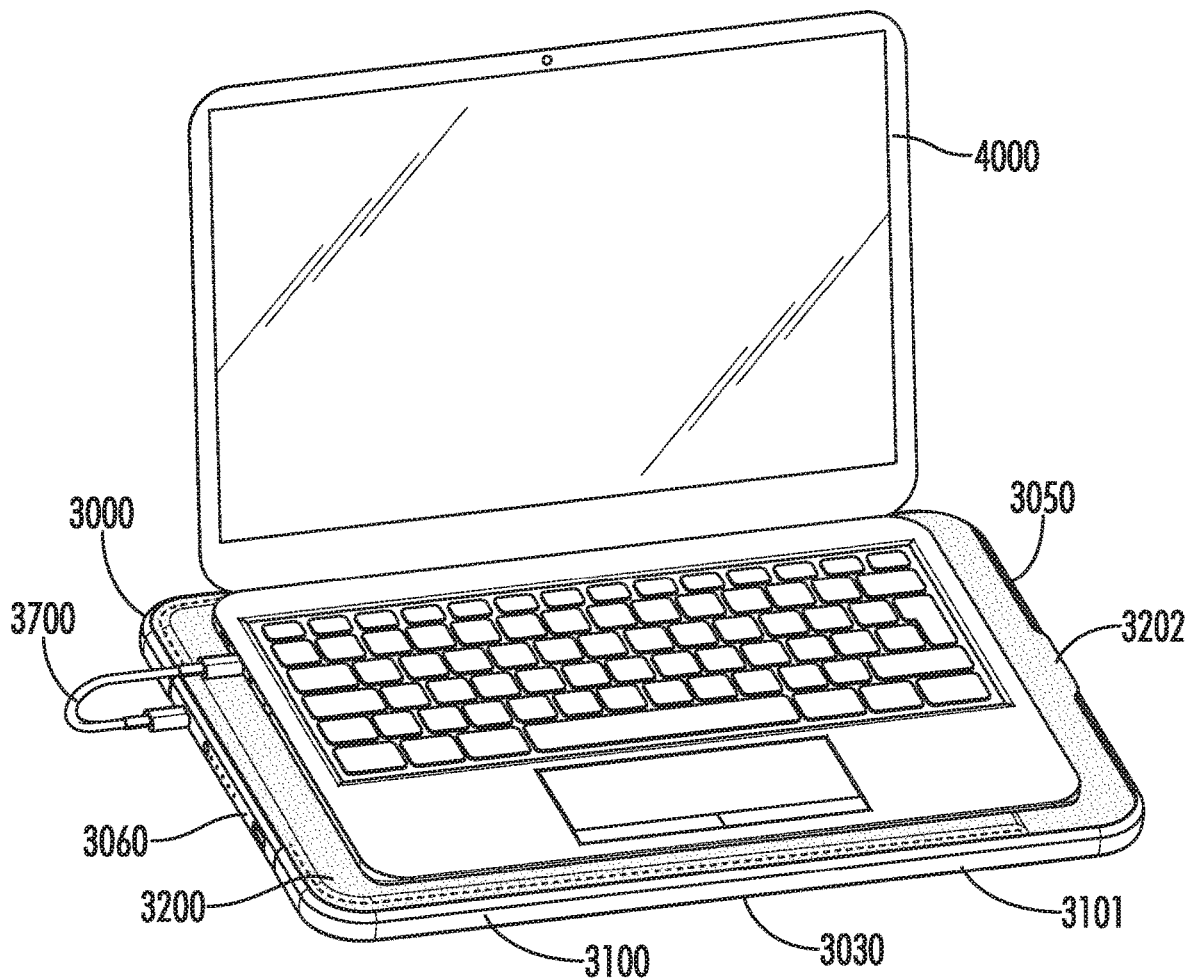

FIGS. 26-43 illustrate an embodiment of the disclosed hybrid frame sleeve case 3000 for a portable electronic device 4000, such as a laptop computer or tablet, where the case includes a charging system. The particular sleeve case illustrated in the drawings is configured for a Macbook Pro®, such as the one shown in FIG. 42G. The case 3000 is capable of allowing the user to charge the portable electronic device, with or without a wire, whether the device is inside or outside the case. In addition, the case is capable of charging other devices connected to the electrical interface connectors, which also allows the sleeve case to be charged through outside power sources.

In the illustrated embodiment, the case 3000 is rectangular in shape with rounded corners and includes front face, back face, left, right, top and bottom sides 3010, 3020, 3020, 3030, 3040, 3050, and 3060 respectively. The shape of the case 3000, and particularly the device compartment 3600, generally corresponds to the external shape of the portable electronic device for which the case is configured, which for laptop computers would be determined when the laptop is in the fully closed position such that the screen is closed over the keyboard.

The case 3000 is comprised of a frame structure 3100, a front face panel 3200, and a back face panel 3300. The back face panel 3300 houses a rechargeable battery 3325, which is connected to external and internal electrical interfaces 3421, 3422, 3431, and 3432, respectively, via a printed circuit board (PCB) 3410 that facilitates and controls the charging operations of the rechargeable battery 3325 of the case. The PCB 3410 is secured to the case via a rigid mounting support 3500 that is attached to the back face panel 3300 via mechanical fasteners (e.g., screws, rivets, or the like) and/or adhesive or other suitable methods of attachment. An LED battery charge gauge 3440 is, also electrically connected to the PCB and mounted to the case so as to be externally visible to the user. A user activation button 3445 is provided and electrically connected to the PCB and mounted to the case to allow the user to externally engage and activate the charging operations of the case.

The front and back face panels 3100 and 3200 are attached to the frame structure 3100 on opposing sides thereto via stitching 3900 and/or other suitable techniques (e.g., glue, epoxy, welding, and/or fusing). When assembled, the front face panel 3200 and the perimeter region of the back face panel 3300 are flush or almost flush with the adjacent region of the exterior edge surface 3001 of the frame structure 3100 so as to provide an integrated and seamless appearance and construction. It should be understood, however, that in some embodiments the front and/or back face panel may be slightly below (e.g., slightly lower) or slightly above (e.g., slight higher) the adjacent regions of the exterior edge 3001 of frame structure 3100.

To provide access to the case, the front face panel 3200 includes an access flap 3201 (best illustrated in FIG. 42B) that bends along a fold line and allows the user to open, the sleeve and slide the portable electronic device into and out of the sleeve compartment 3600. To bias or otherwise keep the access flap 3201 in the closed position, magnetic elements or material (e.g., iron sheet) is incorporated into or otherwise attached to the flap 3201. The magnetic elements or material in the access flap 3201 are positioned so that they overlie the magnets 3800 when the flap is in the closed position so that the magnetic attraction there-between keeps the flap closed. Opening the access flap 3201 also allows the user to also access a connector cable 3700 that may be employed to connect a portable electronic device to the rechargeable battery 3325 to facilitate charging of the device as, for example, illustrated in FIG. 42G.

The front face panel 3200 and frame structure 3100 may be formed of any suitable material and construction, as described above. In the illustrated embodiments, the front face panel 3200 is comprised of a multilayered flexible construct that includes a cushion core (such as neoprene or polychloroprene, synthetic rubber, or other cushioning material) overlaid by synthetic or natural fabric on its inner and outer surfaces. The fabric may be laminated or otherwise adhesively attached or adhered to the cushioning core. The fabric laminated on the outside surface of the cushion core layer may be different than the fabric laminated on the inside surface of the cushion core, which may be softer and less abrasive (e.g., a faux fur lining) to protect the outer surfaces of the portable device. Once the multi layered construct of the front face panel 3200 is formed, the construct is cut to size and attached to the frame structure 3100, by stitching or other techniques as previously described.

Figure 39:
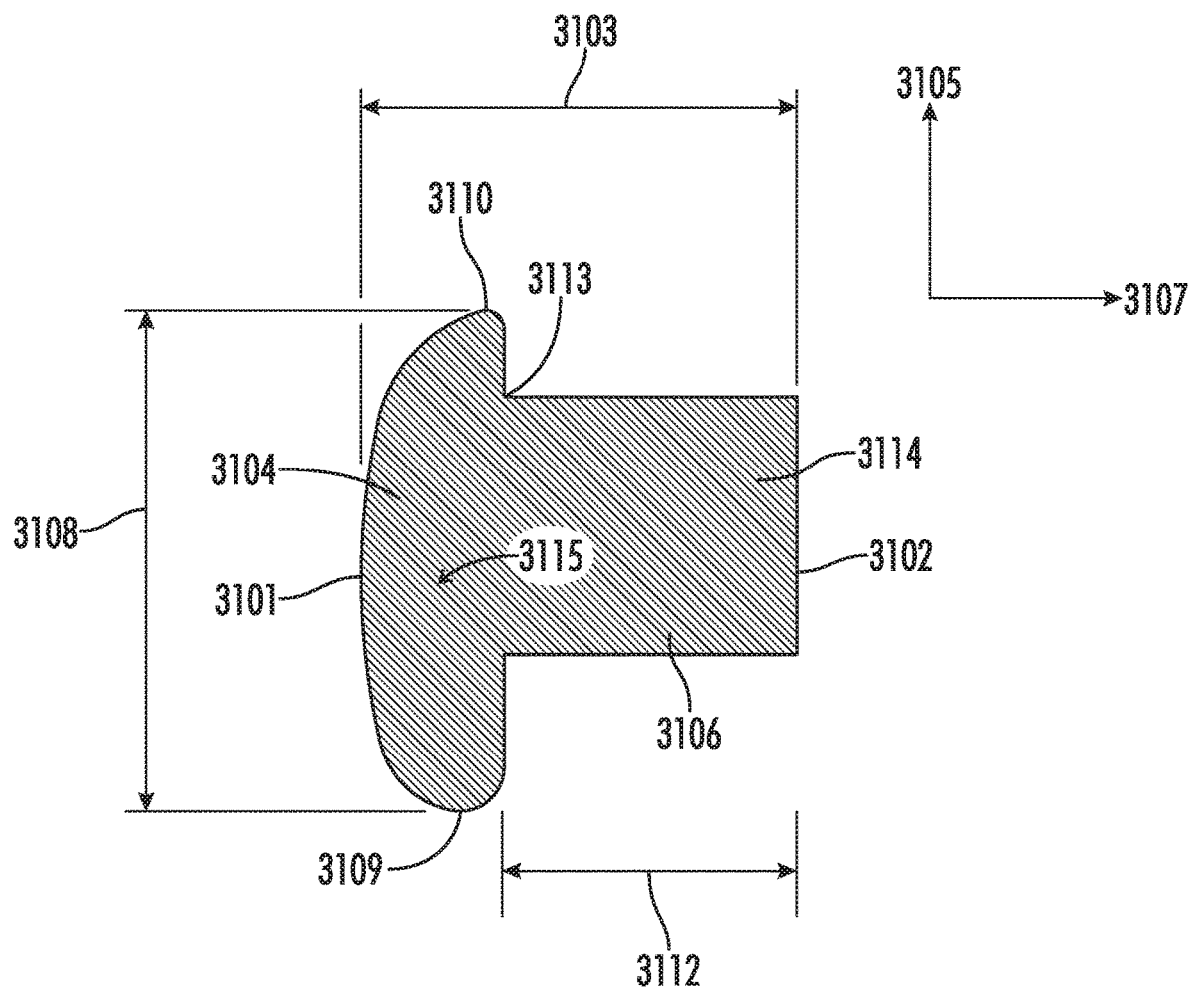
FIG. 39 is a cross section view line drawing of the frame structure illustrated in FIG. 37 taken along line 14-14 as illustrated in FIG. 37.

The frame structure 3100 (best illustrated in FIGS. 34, 37, 38, 39 and 40) is comprised of a frame border having an exterior edge 3101 and interior edge 3102. The exterior and interior edges are separated by the width 3003 of the frame border. The interior edge surrounds a perimeter of a device compartment 3600. As best illustrated in FIG. 39, the frame structure 3000 has a generally T-shaped cross section and includes a first portion 3104 extending in a first direction 3105 and a second portion 3106 extending in a second direction 3007 that is transverse to the first direction. The first portion 3104 comprises the exterior edge 3101 and the second portion 3106 comprises the interior edge 3102. The first portion 3104 has a first length 3108 from a first end 3109 (which is located at the back face side 3020) to a second end 3110 (which is located at the front face side 3010) in the first direction 3105. The second portion 3106 has a second length 3112 from a third end 3113 to a fourth end 3114 (which is located at the interior edge 3102) in a second direction 3107. The second portion 3106 is coupled to the first portion 3104 at a point 3115 between the first and second ends 3109 and 3110 and extends in the second direction 3107 away from the first portion 3104 a second length 3112.

As best illustrated in FIGS. 34, 37-38, and 40, the configuration and lengths 3108 and 3112 of the first and second portions 3104 and 3106 respectively vary depending on the location where the cross section is taken. In the illustrated embodiment, the left and right sides 3030 and 3040 of the frame structure 3100 are symmetrical and have a uniform cross-section such as that depicted in FIG. 39. The frame structure 3000 at the top end 3050 of the case 3000 has, by contrast, a second portion 3106 that has a substantially longer length 3112 than the second portion 3106 located at the sides 3030 and 3040 of the case 3000 and includes therein internal compartments 3120 for housing magnets 3800 and an internal compartment 3130 that is configured to retentively secure and house the cable 3700 therein. In addition, the second portion 3106 of the frame structure 3100 that resides at the top side 3050 of the case 3000 includes a recessed region 3140 that is configured to receive and be covered, in a flush configuration, by a magnet cover 3850 which assists in maintaining the magnets 3800 in place with their compartments 3120. The magnet cover 3850 may be attached by glue, epoxy, welding, fusing, lamination, or other techniques for attaching polymers.

In some embodiments, the frame structure is formed of injected molded ethylene vinyl acetate (EVA) as a unitary component as described above. Other suitable materials may also be used. The material that forms the cushion core of the front face panel 3200 may be the same or different than, the material that forms the frame structure 3100. In some embodiments, the cushion core of the front face panel 3200 is formed of a neoprene sheet and the frame structure 3100 is formed of injected molded ethylene vinyl acetate (EVA).

Figure 35:
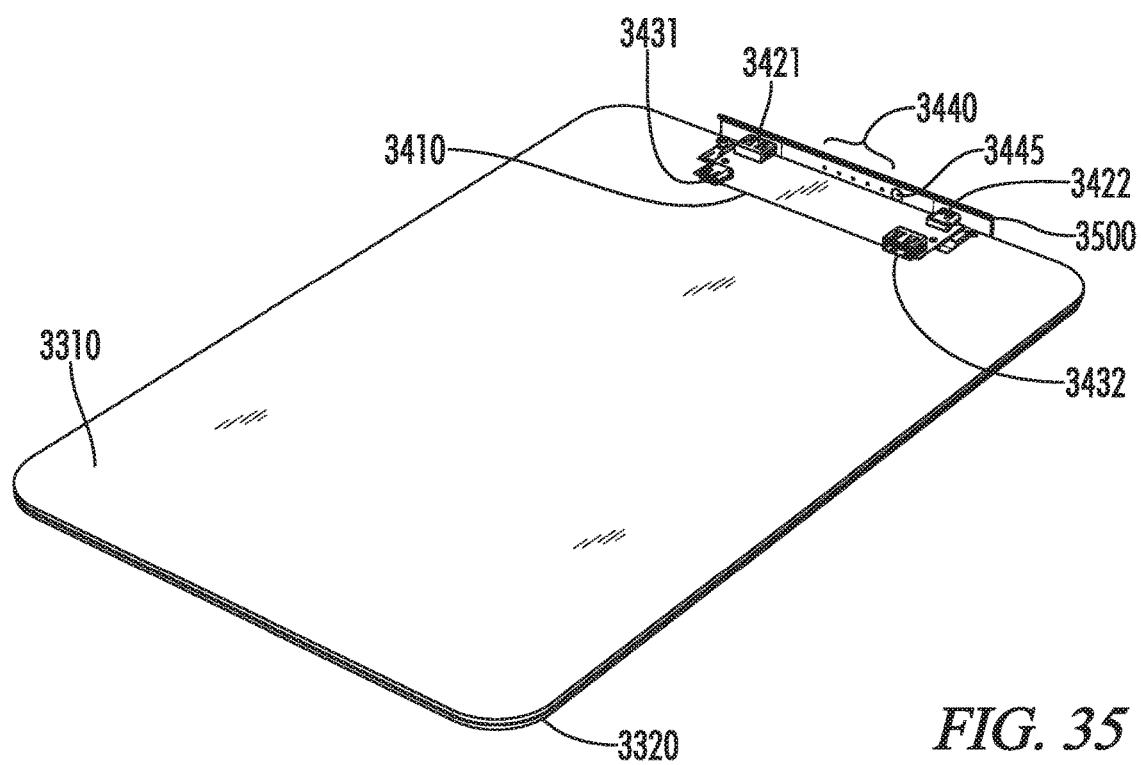
FIG. 35 is a perspective view line drawing of the embodiment depicted in FIG. 34 with the frame structure and connector cable removed to better illustrate the internal panel of the back face side panel, the PCB, and the controls and electrical interfaces coupled thereto.
Figure 36:
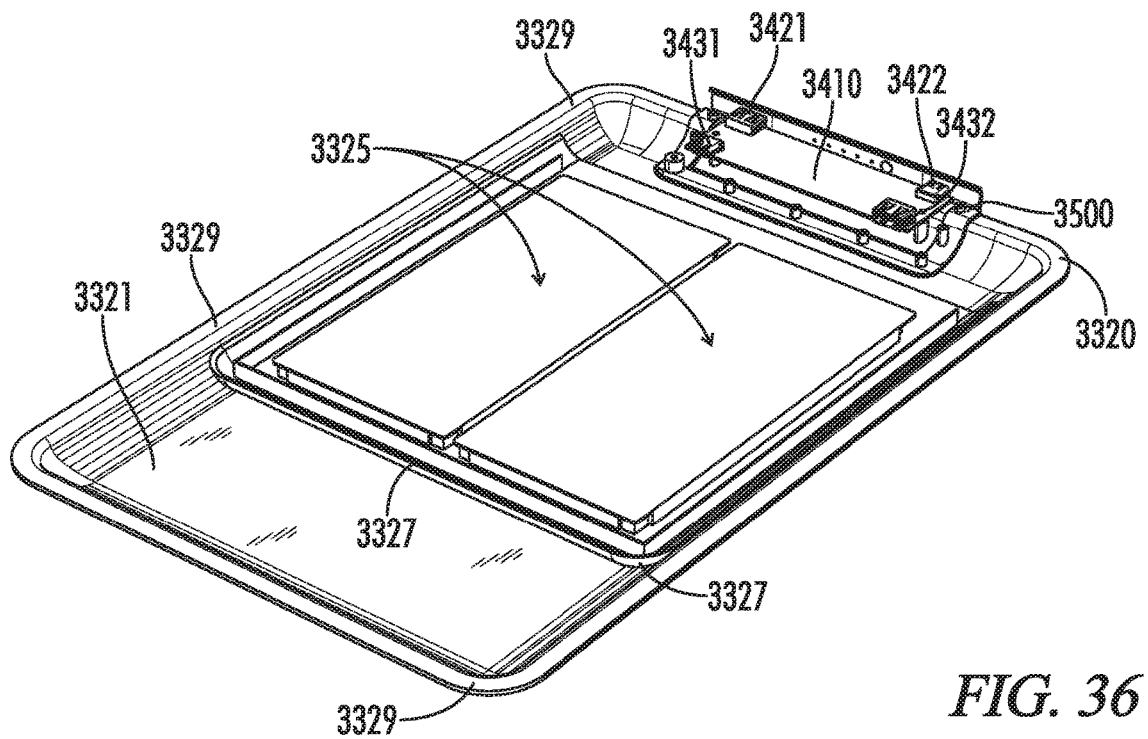
FIG. 36 is a perspective view line drawing of the embodiment depicted in FIG. 35 with the internal panel of the back face side panel removed to better illustrate the battery compartment, rechargeable battery housed therein, and the internal configuration of the outer panel of the back face side panel.
Figure 37:
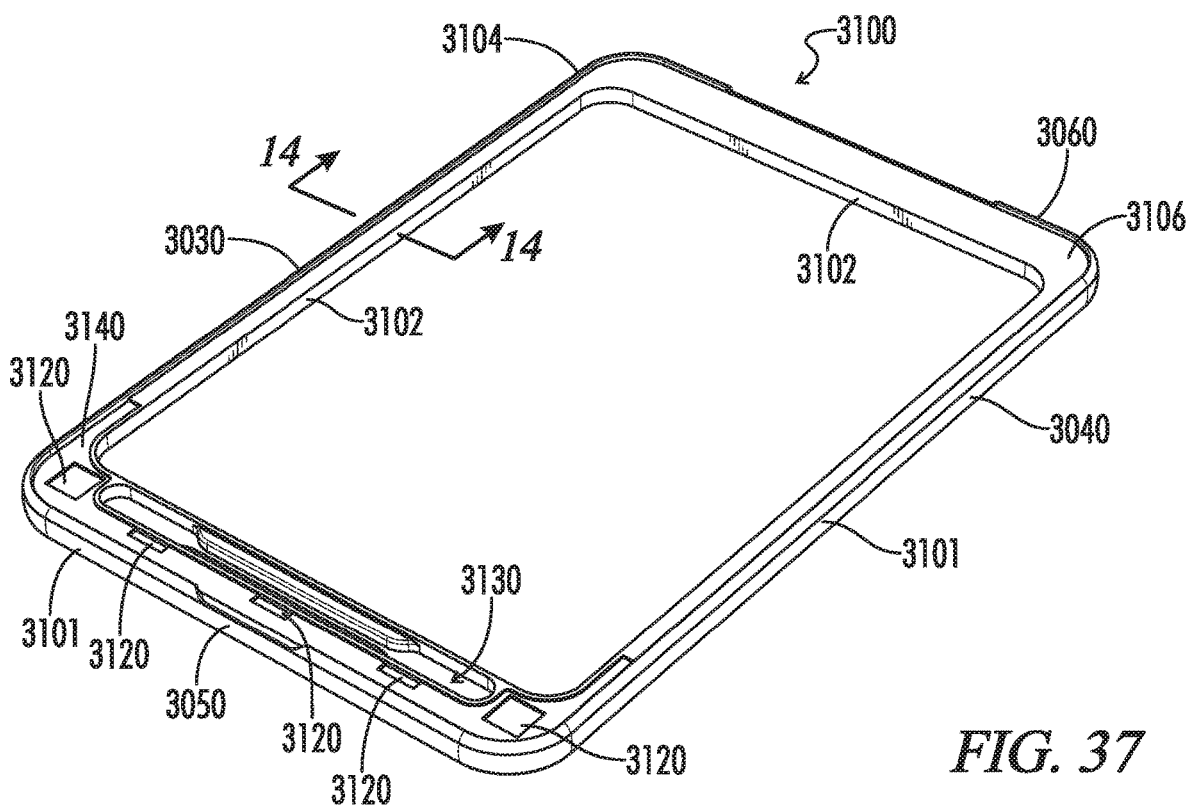
FIG. 37 is a front face perspective view rendering of the frame structure employed in the embodiment illustrated in FIG. 26 in isolation.
Figure 38:
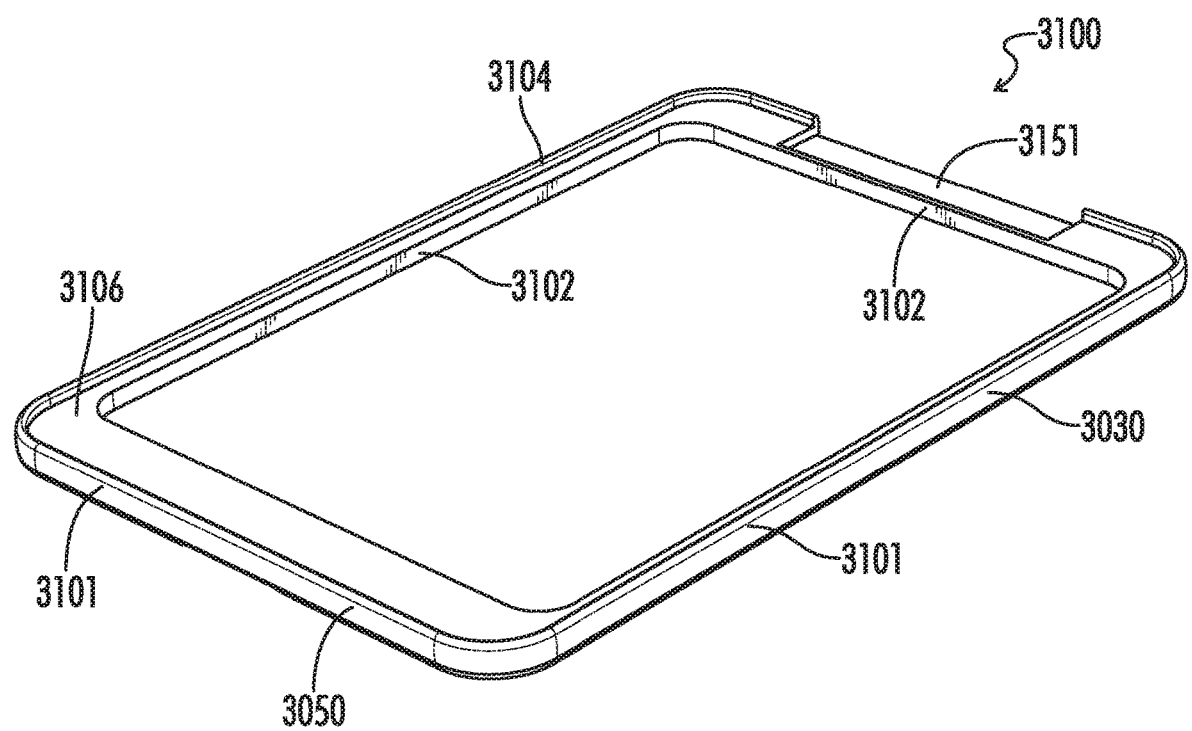
FIG. 38 is a back face perspective view rendering of the frame structure employed in the embodiment illustrated in FIG. 26 in isolation.

As best illustrated in FIGS. 35 and 36, the back face panel 3300 is comprised of an internal panel 3310 and an outer panel 3320. The outer panel 3320 defines a battery compartment 3321 that houses a rechargeable battery 3325. The outer panel 3320 includes a flat perimeter region 3329 that is configured to mate with the perimeter surface of the internal panel 3310. A rigid battery tray 3327 is included to further protect and support the rechargeable battery 3325. The outer panel 3320 may be formed of any suitable material. In some embodiments, the outer panel 3320 is formed of a multilayered construct comprising a compression molded EVA sheet core that is laminated on its outer surface with a fabric, the same fabric as that laminated on the outer surface of the front face panel 3200. Once the multilayered construct is formed, the multilayered construct is molded into shape to define the battery compartment 3321 and cut to size for assembly to the other components. The internal panel 3310 may be formed of a soft or flexible material to serve as a cushion between the rechargeable battery 3325 and the electronic device contained in the device compartment 3600. In some embodiments, the internal panel 3310 has the same material as that of the front face side, panel 3200. Alternatively, the internal panel 3310 may be formed of other suitable materials such as a thin sheet of rigid plastic or other polymer. The surface of the internal panel 3310 that faces the device compartment 3600 may be lined with a suitable fabric such as faux fur to protect the device.

The rechargeable battery 3325 may be comprised of one or more rechargeable batteries or battery banks connected to a PCB 3410. The PCB 3410 is connected to the rechargeable battery 3325 via connection 3326 (illustrated in the block diagram of FIG. 41) and controls the charging and discharging of the rechargeable battery 3325. Electrical interfaces 3421, 3422, 3431, and 3432 are mounted to the PCB. These electrical interfaces may be any suitable standard or proprietary connector such as a USB connector, a contact connector, an Apple Lightning connector, and/or a magnetically retained connector.

The external electrical interfaces 3421 and 3422, in some embodiments, may be USB type A and USB type C female connectors, respectively, that are adapted to allow for charging into and out from the rechargeable battery 3325. The internal electrical interfaces 3431 and 3432 are selected and positioned to enable connection with the electrical interface or connector on the portable electronic device when the device is inserted into the case. Thus for example, if the portable electronic device includes a USB type C female connector on one of its sides, the internal electrical interfaces 3431 and/or 3432 would be mating USB type C connectors and positioned to operationally align into connection with the device connector when the device is inserted into the case. Similarly, if for example the portable electronic device includes an Apple Smart connector, then the internal electrical interfaces 3431 and/or 3432 would be of the same type and positioned internally within the sleeve compartment to operationally align with the Apple Smart connector on the device when the device is inserted into the case. Magnetically retained connectors, such as the Apple MagSafe connector and those described in U.S. Pat. No. 7,658,613, which is hereby incorporated by reference in its entirety, may also be used as internal electrical interfaces 3431 and or 3432 to facilitate alignment and connection to the device. In some embodiments, an electrical adaptor is provided that connects to the portable electronic device connector on one side and provides a magnetic or contact connection on the other side which is adapted to interface with the internal electrical interfaces positioned within the sleeve compartment.

The positioning of the internal electrical connectors 3431 and 3432 is determined to correspond with the position of the corresponding electrical connectors on the device. Positioning the internal electrical connectors 3431 and 3432 in the sleeve so that one of the internal electrical connectors is in operational alignment with a corresponding device connector when the device is inserted into the sleeve in a first orientation and a second internal electrical connecter is in operational alignment with a corresponding device connector when the device is inserted in the sleeve in a second orientation allows the case to charge the device when the device is inserted in the sleeve from different sides or upside down. For devices that have multiple charging ports or connectors, a plurality of internal electrical connectors positioned in the sleeve compartment allows the case to charge the device through one or more device connectors simultaneously or in the alternative.

Figure 43:
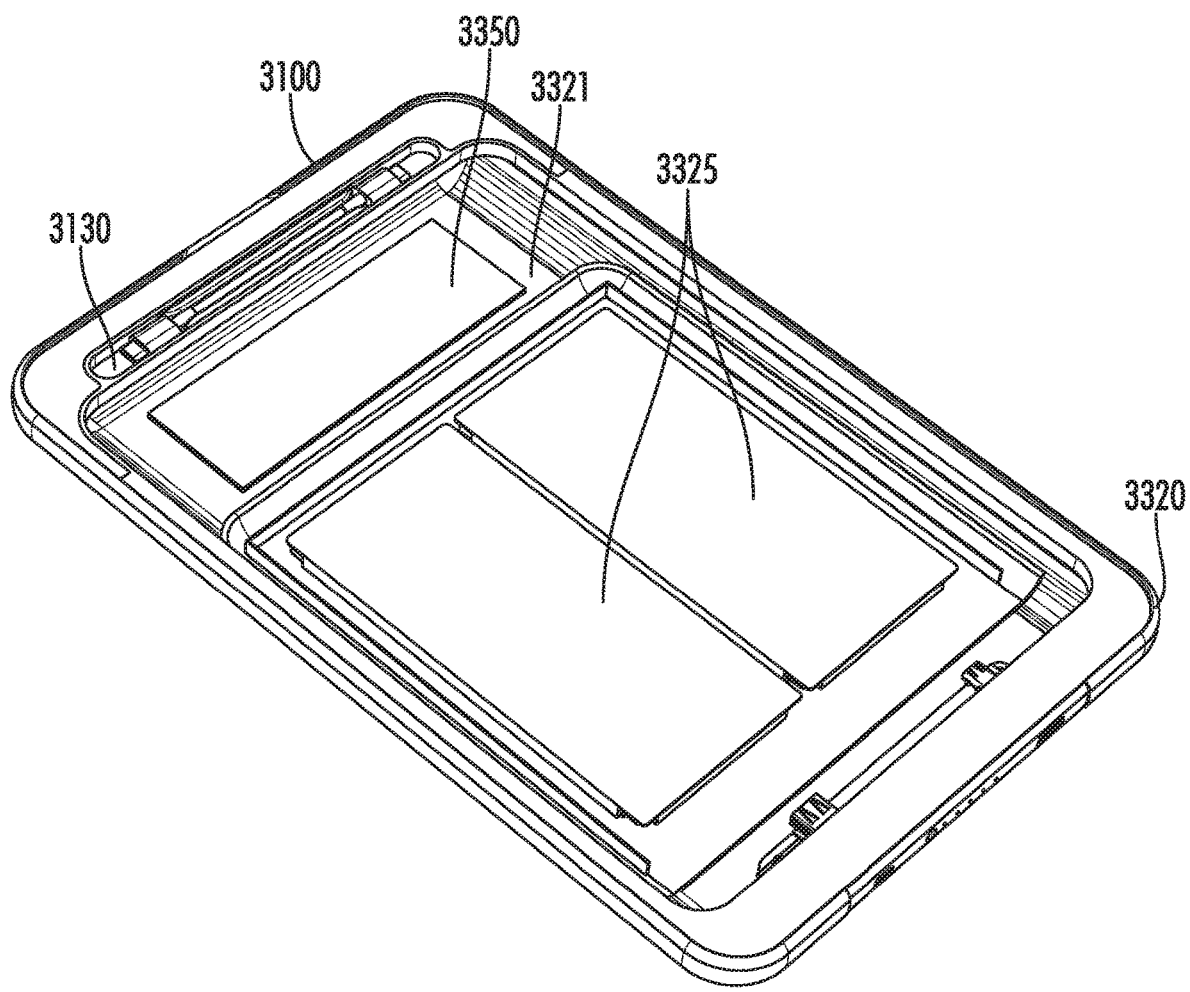
FIG. 43 is a perspective view of the embodiment depicted in FIG. 35 with the internal panel of the back face side panel removed to better illustrate the battery compartment, rechargeable battery housed therein, a wireless charging component housed therein, and the internal configuration of the outer panel of the back face side panel.

In some embodiments, one or more wireless (or inductive) charging components 3350 may be included in the battery compartment 3321, or other locations in the power sleeve case 3000, as best shown in FIG. 43. The wireless charging components 3350 may include one or more wireless charging receivers and or wireless charging transmitters. The wireless charging components 3350 may be configured to charge one or more wireless charging enabled devices (e.g., phone, tablet, smart watch, etc.) housed in or adjacent to the power sleeve case 3000. In this configuration, the wireless charging components 3350 include an inductive transmitter that is adapted to wirelessly charge a correspondingly enabled device in sufficient proximity to the transmitter (e.g., housed inside or on top of the power sleeve case 3000) by transmitting power from the rechargeable battery 3325 and wirelessly transferring that energy to a wireless receiver of the wireless charging enabled device to thereby power the device and/or recharge the battery of the wireless charging enabled device.

In other embodiments, the wireless charging components 3350 may be configured to include an inductive wireless receiver that is capable of receiving charge from an external corresponding wireless transmitter and transmitting that charge to the rechargeable battery 3325 positioned in the power sleeve case 3000, thereby recharging the battery 3325 wirelessly. Hence, power from an external power source can be transferred to the rechargeable battery 3325 through the wireless charging component 3350.

Further, it should be understood that the wireless charging components 3350 may include both, inductive receiver and transmitters to facilitating recharging of the rechargeable battery 3325 and wireless charging of wireless charging enabled devices as described above. The wireless charging components 3350 may be compatible with one or more wireless charging standards (for example, Qi, PMA, AirFuel Alliance standards, etc.).

Figure 40:
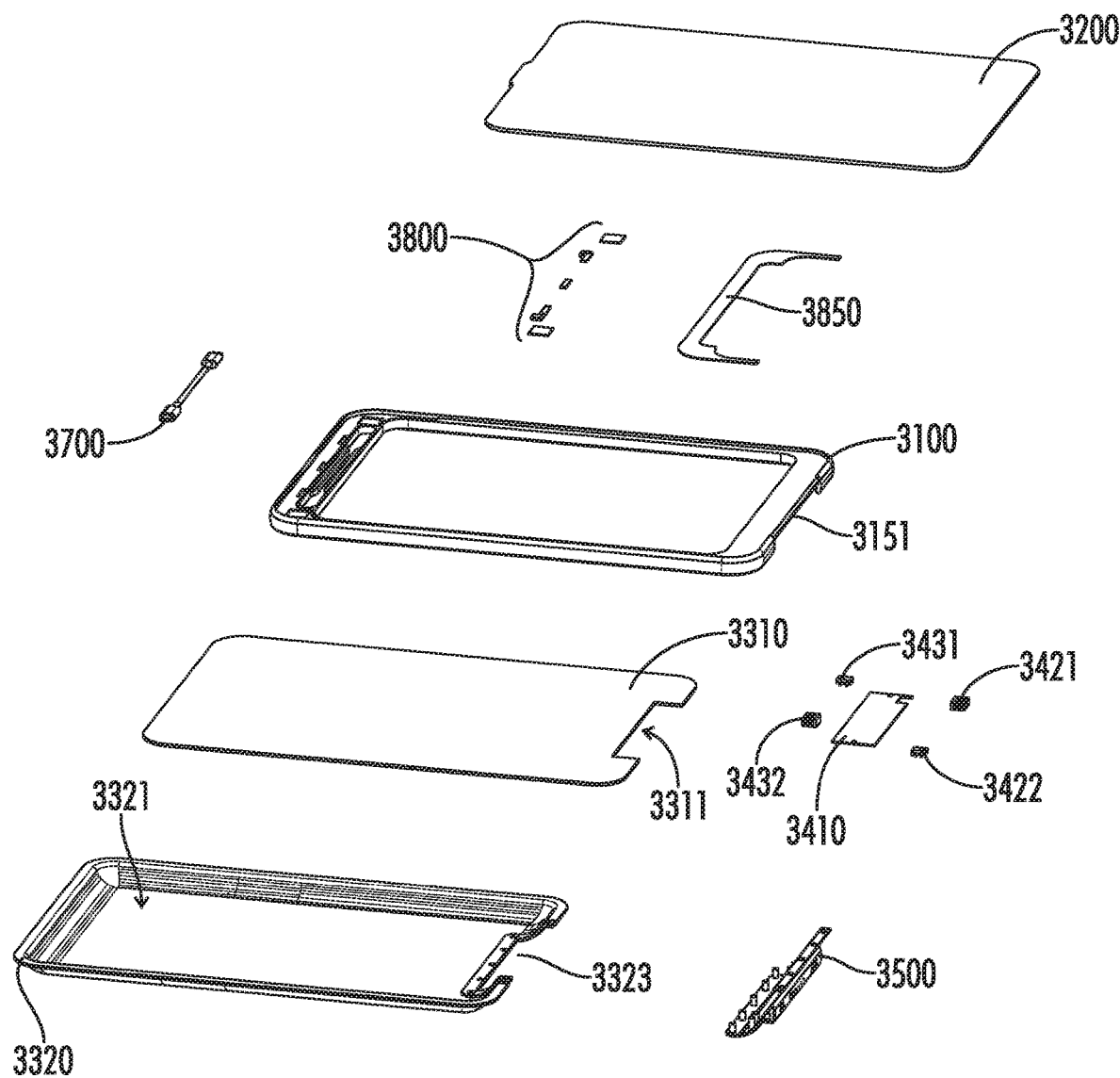
FIG. 40 is an exploded view line drawing of some of the components of the embodiment illustrated in FIG. 26. The rechargeable battery is not depicted.
Figure 41:
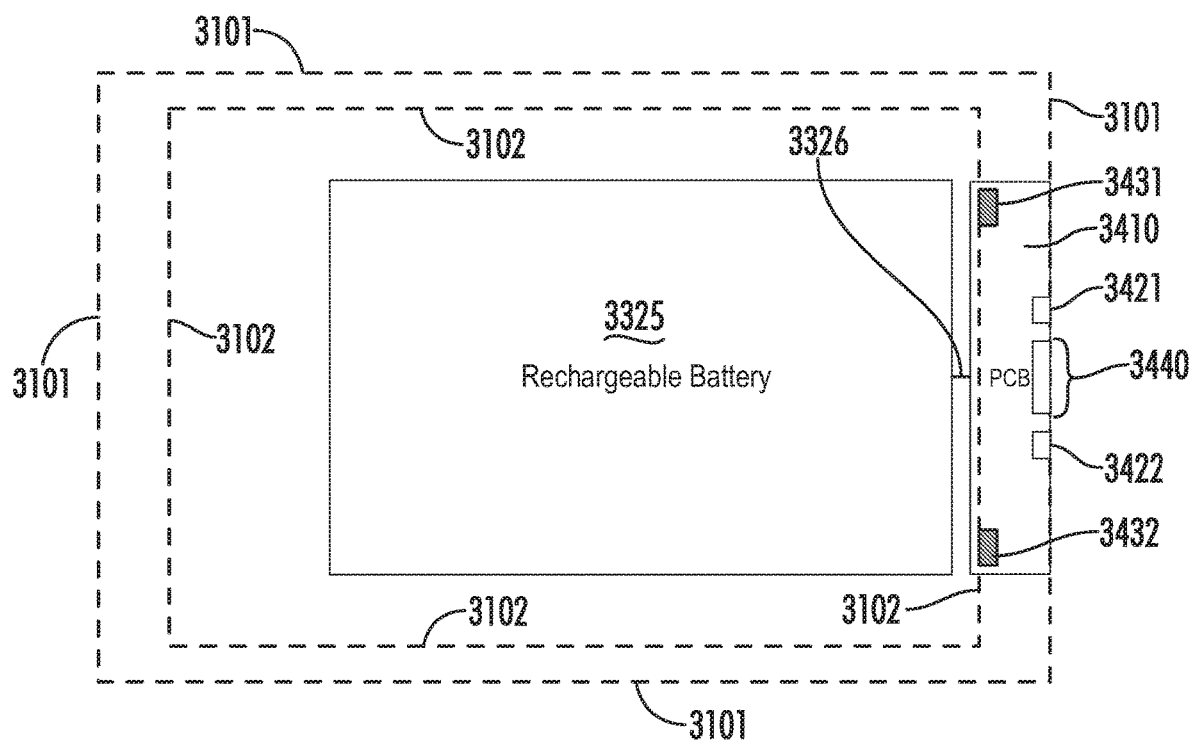
FIG. 41 is a block diagram of electrical components employed in the embodiment illustrated in FIG. 26.

As best illustrated in FIG. 40, with reference to the drawings illustrating the fully or partially assembled case 3000, the rigid mounting support 3500 secures the electrical components 3410, 3421, 3422, 3431, 3432, 3440, and 3445 to the back face panel 3310 via an opening 3323 in the outer panel 3320, a corresponding opening 3311 in, the internal panel 3310 and a corresponding control panel cut out 3151 in the bottom side of the frame structure 3100. Hence those electrical components are housed within the back panel 3300 and the frame structure 3100, which surrounds and provides protection and support to the internal and external electrical interlaces 3421, 3422, 3431, 3432, the PCB 3410, and the other components thereon.

The disclosed case may be made in any color, combination of colors, combination of hues, or combinations of colors and hues.

The previous description of the disclosed embodiments is provided to enable any person skilled in the art to make or use the invention disclosed herein. Although the various inventive aspects are disclosed in the context of certain illustrated embodiments, implementations, and examples, it should be understood by those skilled in the art that the invention extends beyond the specifically disclosed embodiments to other alternative embodiments and/or uses of the invention and obvious modifications and equivalents thereof. In addition, while a number of variations of various inventive aspects have been shown and described in detail, other modifications that are within their scope will be readily apparent to those skilled in the art based upon reviewing this disclosure. It should be also understood that the scope of this disclosure includes the various combinations or sub-combinations of the specific features and aspects of the embodiments disclosed herein, such that the various features, modes of implementation, and aspects of the disclosed subject matter may be combined with or substituted for one another. The generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

Similarly, the disclosure is not to be interpreted as reflecting an intent that any claim set forth below requires more features than are expressly recited in that claim. Rather, as the following claims reflect, inventive aspects may reside in a combination of fewer than all features of any single foregoing disclosed embodiment.

Each of the foregoing and various aspects, together with those set forth in the claims and summarized above or otherwise disclosed herein, including the figures, may be combined without limitation to form claims for a device, apparatus, system, method of manufacture, and/or method of use.

All references cited herein are hereby expressly incorporated by reference.

What is claimed is:

1. A protective sleeve case for a portable electronic device having on or more externally accessible charging interfaces, said case comprising:
    a frame structure comprising:
        (i) a frame border having an exterior edge and interior edge, wherein the exterior and interior edges are separated by a frame border width and wherein the interior edge surrounds a perimeter of a first compartment for the portable electronic device;
        (ii) a generally T-shaped cross section having a first portion extending in a first direction and a second portion extending in a second direction that is transverse to the first direction, wherein the first portion comprises the exterior edge and the second portion comprises the interior edge, and wherein the first portion has a first length from a first end to a second end in the first direction, and the second portion has a second length from a third end to a fourth end in a second direction, wherein the second portion is coupled to the first portion at a point between the first and second ends, and wherein the second portion extends in the second direction away from the first portion a second length, and
        (iii) at first material that cushions sides of the portable electronic device against side impacts;
    a first side panel coupled to a first side of the frame border, wherein the first side panel is flexible and cushioned and comprises a second material, different from the first material;
    a second side panel coupled to a second side of the frame border, wherein the second side panel is opposed to the first side panel and comprises a third material shaped to define a second compartment;
    a rechargeable battery housed within said second compartment and adapted for charging said portable electronic device;
    one or more electrical interfaces externally mounted on the case and electrically coupled to the rechargeable battery to enable charging to and from said rechargeable battery;
    one or more electrical interfaces internally mounted within the first compartment to enable charging of the portable electronic device when the device is in the protective case;
    a user control button that is electrically coupled to the rechargeable battery to enable activation of charging from the rechargeable battery;
    an LED charge indicator electrically coupled to the rechargeable battery and adapted to indicate the level of charge in the battery, wherein the LED charge indicator is externally visible and is mounted to the frame structure;
    a third compartment formed in the frame structure having a charging cable housed therein; and a mounting plate having a PCB mechanically coupled thereto, wherein the mounting plate is attached to the back face panel, and wherein the PCB is electrically connected to the rechargeable battery, the externally and internally mounted electrical interfaces, the user control button, and the LED charge indicator to enable charging to and from the rechargeable battery and control thereof.

2. The case of claim 1, wherein the first material is more shock absorbing than the second material.

3. The case of claim 2, wherein the first material comprises an ethylene vinyl acetate (EVA) foam, and wherein the second material comprises synthetic rubber.

4. The case of claim 3, wherein the first material comprises an injected molded ethylene vinyl acetate (EVA) foam, wherein the second material comprises a polychloroprene, and wherein the third material comprises a compression molded EVA.

5. The case of claim 1, wherein the first side panel is coupled via stitching to the first side of the frame structure.

6. The case of claim 1, wherein the second side panel is coupled via stitching to the second side of the frame structure.

7. The case of claim 1, wherein a first spring constant for the first material is greater than a second spring constant for the second material.

8. The case of claim 1, wherein the first material has a greater rigidity than that of the second material.

9. The case of claim 1, in said mounting plate is more rigid than said first, second, or third materials.

10. The ease of claim 9, wherein said mounting plate comprises metal.

11. The case of claim 9, wherein said mounting plate comprises a rigid polymer.

12. The case of claim 1, wherein said back face panel comprises an internal panel and an outer panel, and wherein said outer panel is formed of the third material and is shaped to define the second compartment.

13. The case of claim 12, wherein said internal panel covers the second compartment and is closer to the frame structure than the outer panel.

14. The case of claim 1, wherein the first panel comprises a multilayered construct comprising a first fabric laminated on an interior facing surface of the second material and a second fabric laminated on an opposing exterior facing surface of the second material, wherein said first fabric and second fabric are different from one another, and wherein said first fabric and second fabric are formed of materials different than said first, second, or third materials.

* * * * *